(12) United States Patent
Richter

(10) Patent No.: US 11,320,977 B2
(45) Date of Patent: *May 3, 2022

(54) EMERGENT CONTENT CONTAINERS

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,327

(22) Filed: Dec. 21, 2020

(65) Prior Publication Data

US 2021/0109648 A1 Apr. 15, 2021

Related U.S. Application Data

(63) Continuation of application No. 16/429,808, filed on Jun. 3, 2019, now Pat. No. 10,908,796.

(60) Provisional application No. 62/679,551, filed on Jun. 1, 2018.

(51) Int. Cl.
  *G06F 3/04845* (2022.01)
  *G06F 3/0486* (2013.01)
  *G06F 3/0482* (2013.01)
  *G06F 3/16* (2006.01)

(52) U.S. Cl.
  CPC ........ *G06F 3/04845* (2013.01); *G06F 3/0482* (2013.01); *G06F 3/0486* (2013.01); *G06F 3/167* (2013.01); *G06F 2203/04803* (2013.01)

(58) Field of Classification Search
  CPC .. G06F 3/04815; G06F 3/0382; G06T 19/006
  See application file for complete search history.

(56) References Cited

U.S. PATENT DOCUMENTS 10,303,323 B2 * 5/2019 Gribetz ................. G06T 19/006
10,510,190 B2 * 12/2019 Scavezze ................ G06F 3/011

OTHER PUBLICATIONS https://www.youtube.com/watch Unity VR Tutorial 2018 (Year: 2018).*
Youtube, "Unity VR Tutorial 2018—How to create your first VR app in 11 minutes for Google Cardboard", May 27, 2018, Retrieved from the Internet on Jul. 13, 2020: https://www.youtube.com/watch?v=OEP7sMwfZnE.

* cited by examiner

*Primary Examiner* — Cao H Nguyen
(74) *Attorney, Agent, or Firm* — Fernando & Partners, LLP

(57) ABSTRACT

In some implementations, a method includes displaying a user interface that includes an objective-effectuator and a first affordance to manipulate the objective-effectuator. In some implementations, the objective-effectuator is characterized by a set of predefined objectives and a set of visual rendering attributes. In some implementations, the method includes instantiating the objective-effectuator in an emergent content container. In some implementations, the emergent content container allows the objective-effectuator to perform actions that satisfy the set of predefined objectives. In some implementations, the method includes displaying a second affordance in association with the emergent content container. In some implementations, the second affordance controls an operation of the emergent content container.

21 Claims, 22 Drawing Sheets

EMERGENT CONTENT CONTAINERS

CROSS REFERENCE TO RELATED APPLICATIONS

This application claims priority to U.S. provisional patent application No. 62/679,551, filed on Jun. 1, 2018, and U.S. non-provisional patent application Ser. No. 16/429,808, filed on Jun. 3, 2019, which are hereby incorporated by reference in their entireties.

TECHNICAL FIELD

The present disclosure generally relates to instantiating objective-effectuators in emergent content containers.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
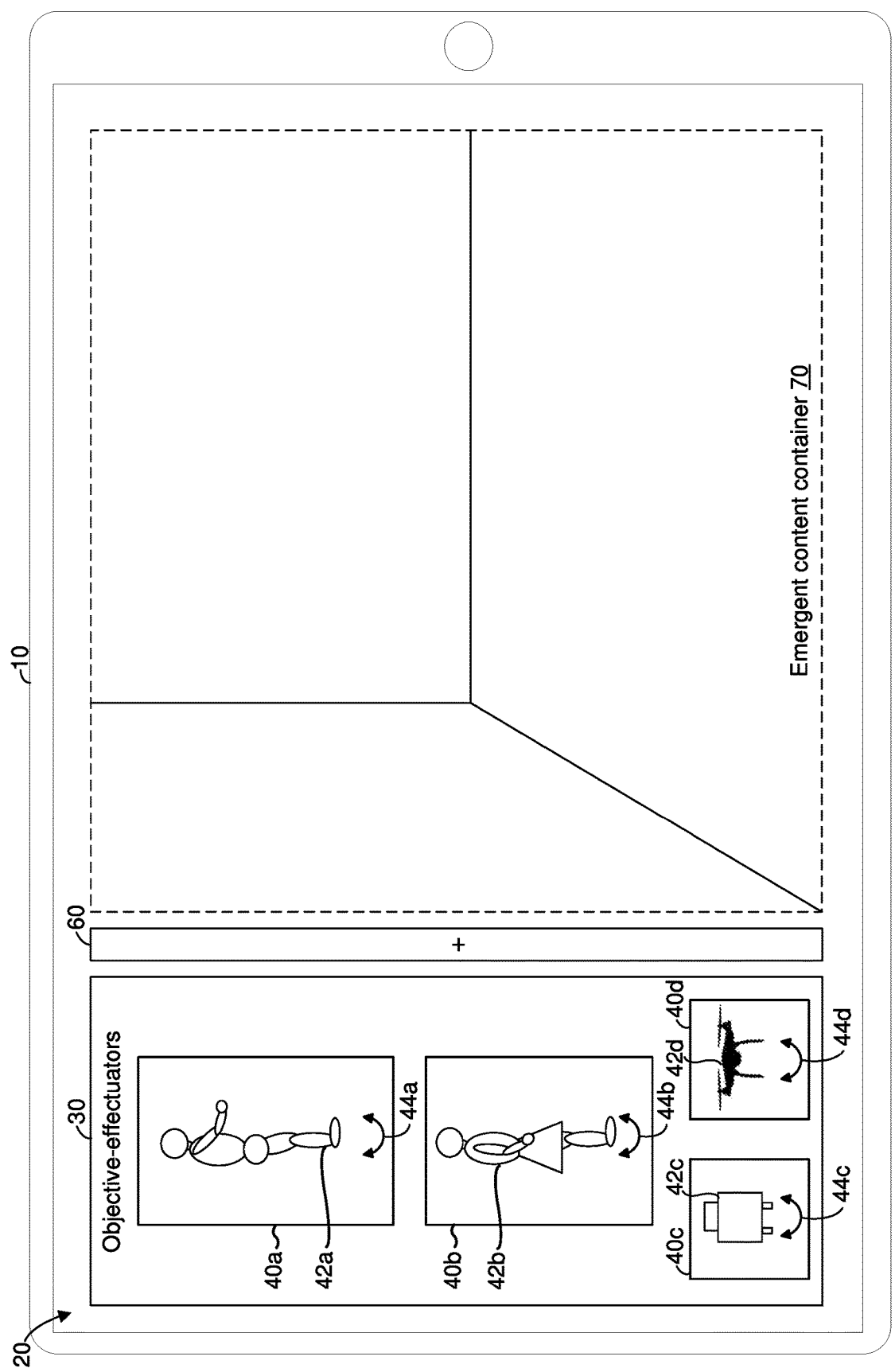
FIGS. 1A-1P are diagrams of an example user interface in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for instantiating objective-effectuators in emergent content containers. In various implementations, a device includes a non-transitory memory and one or more processors coupled with the non-transitory memory. In some implementations, a method includes displaying a user interface that includes an objective-effectuator and a first affordance to manipulate the objective-effectuator. In some implementations, the objective-effectuator is characterized by a set of predefined objectives and a set of visual rendering attributes. In some implementations, the method includes instantiating the objective-effectuator in an emergent content container. In some implementations, the emergent content container allows the objective-effectuator to perform actions that satisfy the set of predefined objectives. In some implementations, the method includes displaying a second affordance in association with the emergent content container. In some implementations, the second affordance controls an operation of the emergent content container.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment.

In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for instantiating objective-effectuators in emergent content containers. An emergent content engine generates objectives for objective-effectuators that are instantiated in emergent content containers. The emergent content engine provides the objectives to objective-effectuator engines so that the objective-effectuator engines can generate actions that satisfy the objectives. The objectives generated by the emergent content engine indicate plots or story lines for which the objective-effectuator engines generate actions. Generating objectives enables presentation of dynamic objective-effectuators that perform actions as opposed to presenting static objective-effectuators, thereby enhancing the user experience and improving the functionality of the device presenting the emergent content container.

FIGS. 1A-1O are diagrams of an example user interface 20 on a device 10 in accordance with some implementations. Referring to FIG. 1A, the user interface 20 includes an objective-effectuator pane 30 with a boy objective-effectuator container 40a, a girl objective-effectuator container 40b, a robot objective-effectuator container 40c, and a drone objective-effectuator container 40d. The boy objective-effectuator container 40a includes a CGR representation of a boy objective-effectuator 42a ("boy objective-effectuator 42a", hereinafter for the sake of brevity). The girl objective-effectuator container 40b includes a CGR representation of a girl objective-effectuator 42b ("girl objective-effectuator 42b", hereinafter for the sake of brevity). The robot objective-effectuator container 40c includes a CGR representation of a robot objective-effectuator 42c ("robot objective-effectuator 42c", hereinafter for the sake of brevity). The drone objective-effectuator container 40d includes a CGR representation of a drone objective-effectuator 42d ("drone objective-effectuator 42d", hereinafter for the sake of brevity).

In the example of FIGS. 1A-1O, the boy objective-effectuator 42a represents a boy action figure, the girl objective-effectuator 42b represents a girl action figure, the robot objective-effectuator 42c represents a robot, and the drone objective-effectuator 42d represents a drone. In some implementations, the boy objective-effectuator container 40a includes a boy manipulation affordance 44a to manipulate the boy objective-effectuator 42a, the girl objective-effectuator container 40b includes a girl manipulation affordance 44b to manipulate the girl objective-effectuator 42b, the robot objective-effectuator container 40c includes a robot manipulation affordance 44c to manipulate the robot objective-effectuator 42c, and the drone objective-effectuator container 40d includes a drone manipulation affordance 44d to manipulate the drone objective-effectuator 42d. In the example of FIGS. 1A-1O, the boy manipulation affordance 44a, the girl manipulation affordance 44b, the robot manipulation affordance 44c and the drone manipulation affordance 44d allow rotating the boy objective-effectuator 42a, the girl objective-effectuator 42b, the robot objective-effectuator 42c and the drone objective-effectuator 42d, respectively. In some implementations, the objective-effectuator pane 30 includes affordances (e.g., sliders, drop-downs, switches, buttons, etc.) that allow various configurations of the objective-effectuators (e.g., scaling-up, scaling-down, setting physical/functional/behavioral attributes, etc.).

In various implementations, an objective-effectuator represents a character from fictional material such as a movie, a video game, a comic, and/or a novel. For example, in some implementations, the boy objective-effectuator 42a represents a 'boy action figure' character from a fictional comic, and the girl objective-effectuator 42b represents a 'girl action figure' character from a fictional video game. In some implementations, the objective-effectuator pane 30 includes objective-effectuators that represent characters from different fictional materials (e.g., from different movies/games/comics/novels). In various implementations, the objective-effectuators represent physical articles (e.g., tangible objects). For example, in some implementations, the objective-effectuators represent equipment (e.g., machinery such as planes, tanks, robots, cars, etc.). In the example of FIG. 1A, the robot objective-effectuator 42c represents a robot and the drone objective-effectuator 42d represents a drone. In some implementations, the objective-effectuators represent physical articles (e.g., equipment) from fictional material. In some implementations, the objective-effectuators represent physical articles from a physical environment.

In various implementations, an objective-effectuator performs one or more actions. In some implementations, an objective-effectuator performs a sequence of actions. In some implementations, the emergent content container 70 determines the actions that an objective-effectuator is to perform. In some implementations, the actions of the objective-effectuators are within a degree of similarity to actions that the corresponding characters/things perform in the fictional material. For example, in some implementations, the girl objective-effectuator 42b performs the action of flying (e.g., because the corresponding 'girl action figure' character is capable of flying). Similarly, in some implementations, the drone objective-effectuator 42d performs the action of hovering (e.g., because drones in the physical environment are capable of hovering). In some implementations, the emergent content container 70 obtains the actions for the objective-effectuators that are instantiated in the emergent content container 70. For example, in some implementations, the emergent content container 70 receives the actions for the objective-effectuators from a remote server that determines (e.g., selects) the actions.

In various implementations, an objective-effectuator performs an action in order to satisfy (e.g., complete or achieve) an objective. In some implementations, an objective-effectuator is associated with a particular objective, and the objective-effectuator performs actions that improve the likelihood of satisfying that particular objective. In some implementations, the objective-effectuators are referred to as object representations, for example, because the objective-effectuators represent various objects (e.g., real-world objects, or fictional objects). In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective effectuator representing an environment is referred to as an environmental objective-effectuator. In some implementations, an environmental objective effectuator performs environmental actions to effectuate an environmental objective.

In various implementations, the user interface 20 includes an emergent content container 70. In some implementations, the emergent content container 70 allows an objective-effectuator to perform actions that satisfy an objective (e.g., a set of predefined objectives) of the objective-effectuator. In some implementations, the device 10 receives an input (e.g., a user input) to instantiate an objective-effectuator in the emergent content container 70. In such implementations, the emergent content container 70 generates actions for the objective-effectuator after the objective-effectuator is instantiated in the emergent content container 70. For example, in some implementations, the emergent content container 70 synthesizes actions that satisfy a set of predefined objectives for the objective-effectuator. In some implementations, the emergent content container 70 selects the actions from a set of predefined actions.

In some implementations, the emergent content container 70 includes a CGR environment. For example, in some implementations, the CGR environment forms a background for the emergent content container 70. In some implementations, the CGR environment includes a virtual environment that is a simulated replacement of a physical environment. In other words, in some implementations, the CGR environment is simulated by the device 10. In such implementations, the CGR environment is different from a physical environment where the device 10 is located. In some implementations, the CGR environment includes an augmented environment that is a modified version of a physical environment. For example, in some implementations, the device 10 modifies (e.g., augments) the physical environment where the device 10 is located in order to generate the CGR environment. In some implementations, the device 10 generates the CGR environment by simulating a replica of the physical environment where the device 10 is located. In some implementations, the device 10 generates the CGR environment by removing and/or adding items from the simulated replica of the physical environment where the device 10 is located.

In some implementations, the emergent content container 70 is generated based on a user input. For example, in some implementations, the device 10 receives a user input indicating a terrain for the emergent content container 70. In such implementations, the device 10 configures the emergent content container 70 such that the emergent content container 70 includes the terrain indicated via the user input. In some implementations, the user input indicates environmental conditions. In such implementations, the device 10 configures the emergent content container 70 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain or snow).

In some implementations, the user interface 20 includes a new container affordance 60. In some implementations, when the new container affordance 60 is selected, the device 10 (e.g., the user interface 20) creates a new emergent content container (e.g., as shown in FIGS. 1L-1M). As such, in some implementations, the device 10 (e.g., the user interface 20) displays multiple emergent content containers (e.g., two or more emergent content containers, for example, as shown in FIG. 1M-1N).

Figure 1B:
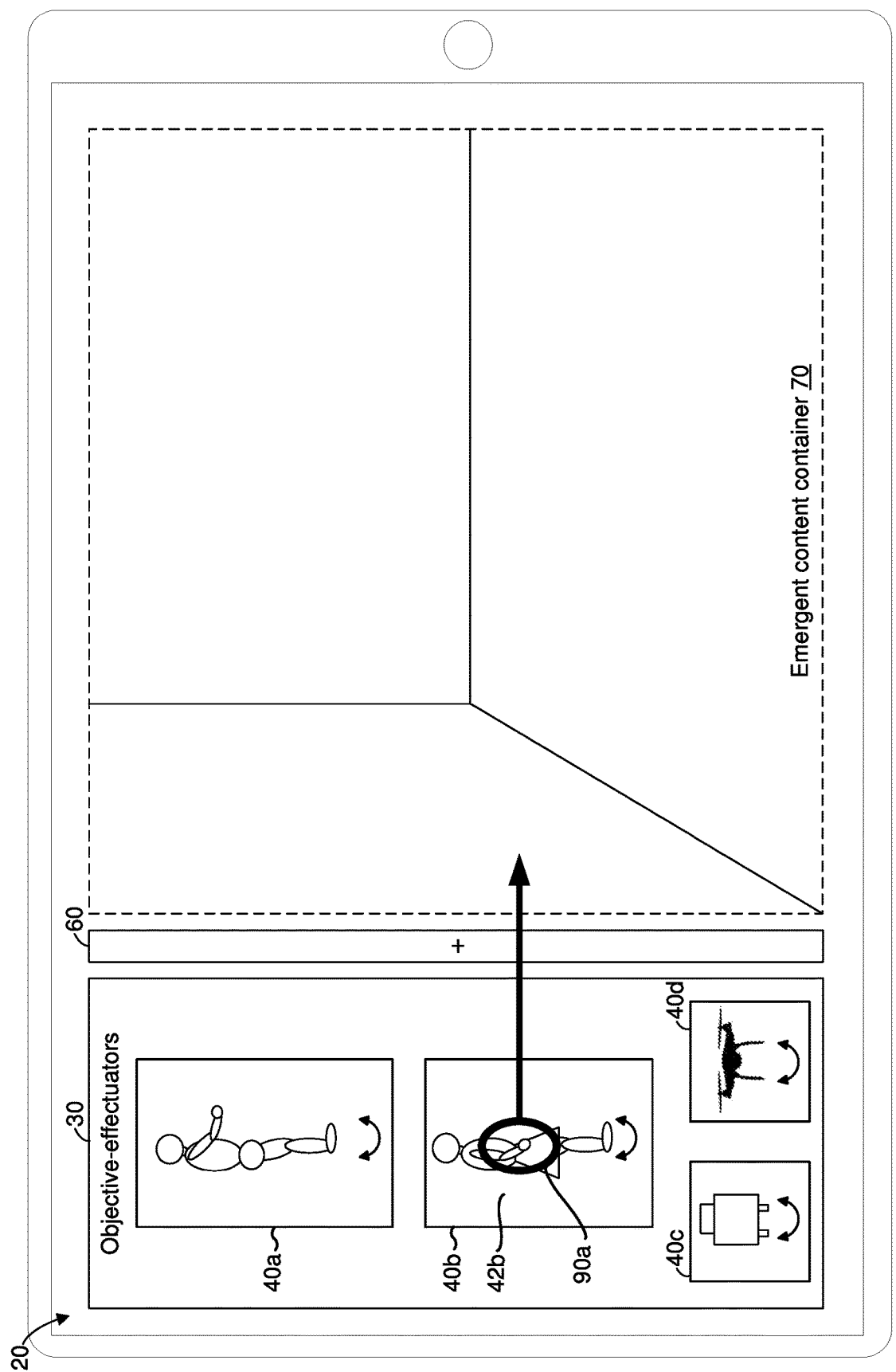

Referring to FIG. 1B, the device 10 detects a user input 90a at a location corresponding to the girl objective-effectuator container 40b. In the example of FIG. 1B, the user input 90a corresponds to a request to instantiate the girl objective-effectuator 42b in the emergent content container 70. In the example of FIG. 1B, detecting the user input 90a includes detecting that the girl objective-effectuator container 40b has been selected, and that the girl objective-effectuator container 40b is being dragged into a display region that corresponds to the emergent content container 70. In some implementations, detecting the user input 90a includes detecting that the girl objective-effectuator container 40b is being dragged into the emergent content container 70.

Figure 1C:
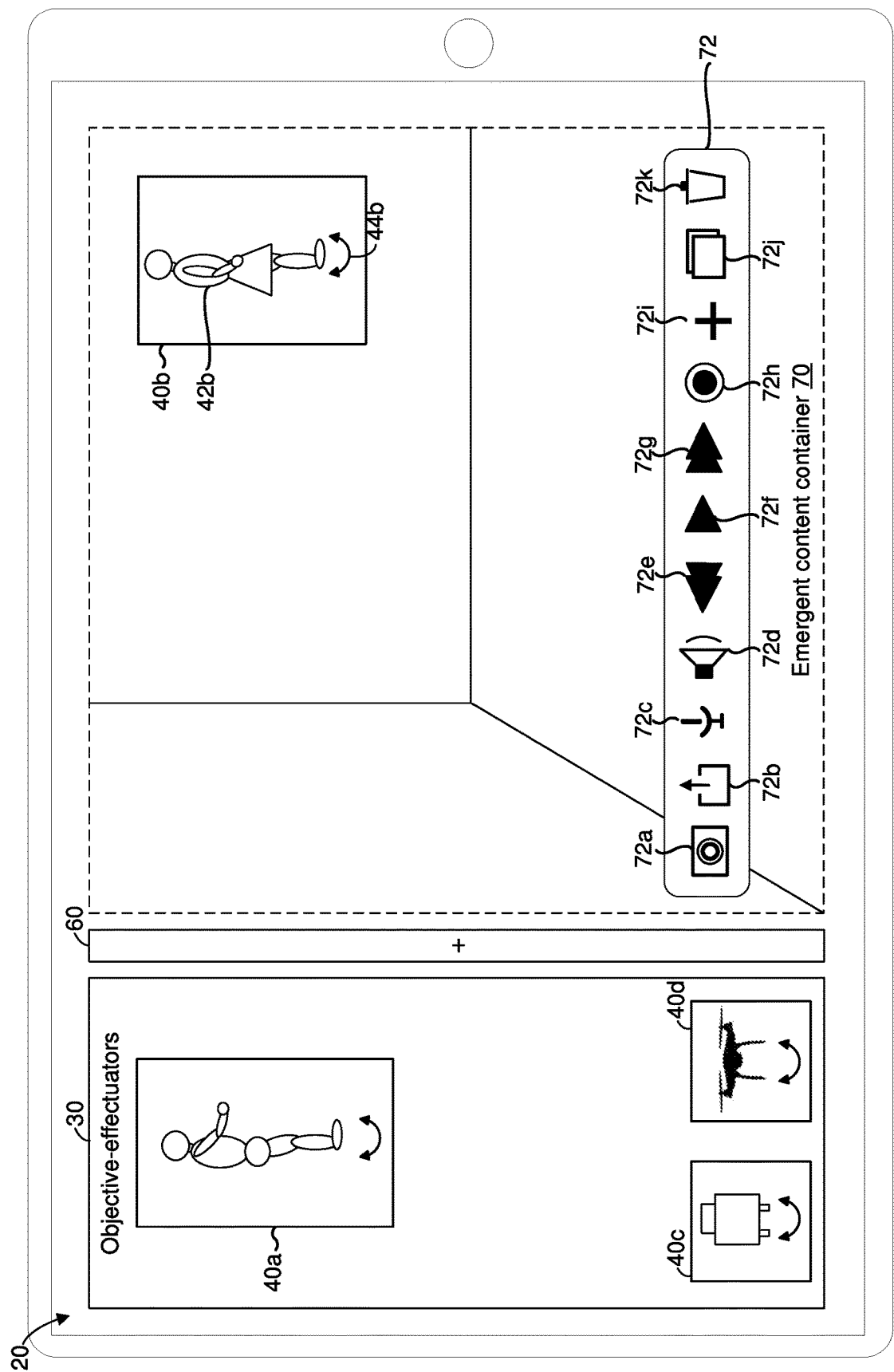

Referring to FIG. 1C, after detecting the user input 90a shown in FIG. 1B, the device 10 (e.g., the user interface 20 and/or the emergent content container 70) instantiates the girl objective-effectuator 42b in the emergent content container 70. In the example of FIG. 1C, the emergent content container 70 includes the girl objective-effectuator container 40b because the emergent content container 70 is being setup. In other words, in the example of FIG. 1C, the emergent content container 70 is in an edit mode in which objective-effectuators are being added to the emergent content container 70.

As illustrated in FIG. 1C, in various implementations, the emergent content container 70 includes various container affordances 72. In some implementations, the container affordances 72 are grouped into a container affordance bar. In various implementations, the container affordances 72 allow various operations to be performed in relation to the emergent content container 70. For example, in some implementations, the container affordances 72 include a screen capture affordance 72a which, in response to being selected, captures an image of the emergent content container 70. In some implementations, the container affordances 72 include a share affordance 72b which, in response to being selected, provides options to share the emergent content container 70 with other devices (e.g., other devices of the same user and/or other devices of other users).

In some implementations, the container affordances 72 include a microphone (mic) affordance 72c which, in response to being selected, allows the user of the device 10 to interact with the objective-effectuators that are instantiated in the emergent content container 70. For example, in some implementations, in response to detecting a selection of the mic affordance 72c, the emergent content container 70 receives an audio input. In such implementations, the emergent content container 70 causes the objective-effectuators that are instantiated in the emergent content container 70 to respond to the audio input. For example, the emergent content container 70 changes the actions that the instantiated objective-effectuators perform in response to the audio input.

In some implementations, the container affordances 72 include a speaker affordance 72d that, when selected, allows the user of the device 10 to control a volume associated with the emergent content container 70 (e.g., so that the user can listen to dialogues recited by the objective-effectuators instantiated in the emergent content container 70).

In some implementations, the container affordances 72 include content playback affordances such as a rewind affordance 72e, a play affordance 72f and a fast forward affordance 72g. In some implementations, a selection of the play affordance 72f causes the emergent content container 70 to transition from the edit mode to a play mode in which the objective-effectuators instantiated in the emergent content container 70 start performing their respective actions. In some implementations, the rewind affordance 72e, when selected, causes the content displayed by the emergent content container 70 to be rewound. In some implementations, the fast forward affordance 72g, when selected, causes the content displayed by the emergent content container 70 to be fast-forwarded. In some implementations, the container affordances 72 include a record affordance 72h that, when selected, causes the content displayed by the emergent content container 70 to be recorded.

In some implementations, the container affordances 72 include an add objective-effectuator affordance 72i that, when selected, provides an option to add an objective-effectuator to the emergent content container 70. In some implementations, the add objective-effectuator affordance 72i allows additional instances of an objective-effectuator that is already instantiated in the emergent content container 70 to be instantiated. In some implementations, the add objective-effectuator affordance 72i allows an instance of an objective-effectuator that is not currently instantiated in the emergent content container 70 to be instantiated.

In some implementations, the container affordances 72 include a duplicate objective-effectuator affordance 72j that, when selected, provides an option to duplicate (e.g., replicate) an objective-effectuator that is already instantiated in the emergent content container 70. In the example of FIG. 1C, a selection of the duplicate objective-effectuator affordance 72j provides an option to duplicate the girl objective-effectuator 42b that is already instantiated in the emergent content container 70.

In some implementations, the container affordances 72 include a delete objective-effectuator affordance 72k that, when selected, provides an option to delete an objective-effectuator that is instantiated in the emergent content container 70. In the example of FIG. 1C, a selection of the delete objective-effectuator affordance 72k provides an option to delete the girl objective-effectuator 42b that is already instantiated in the emergent content container 70.

Figure 1D:
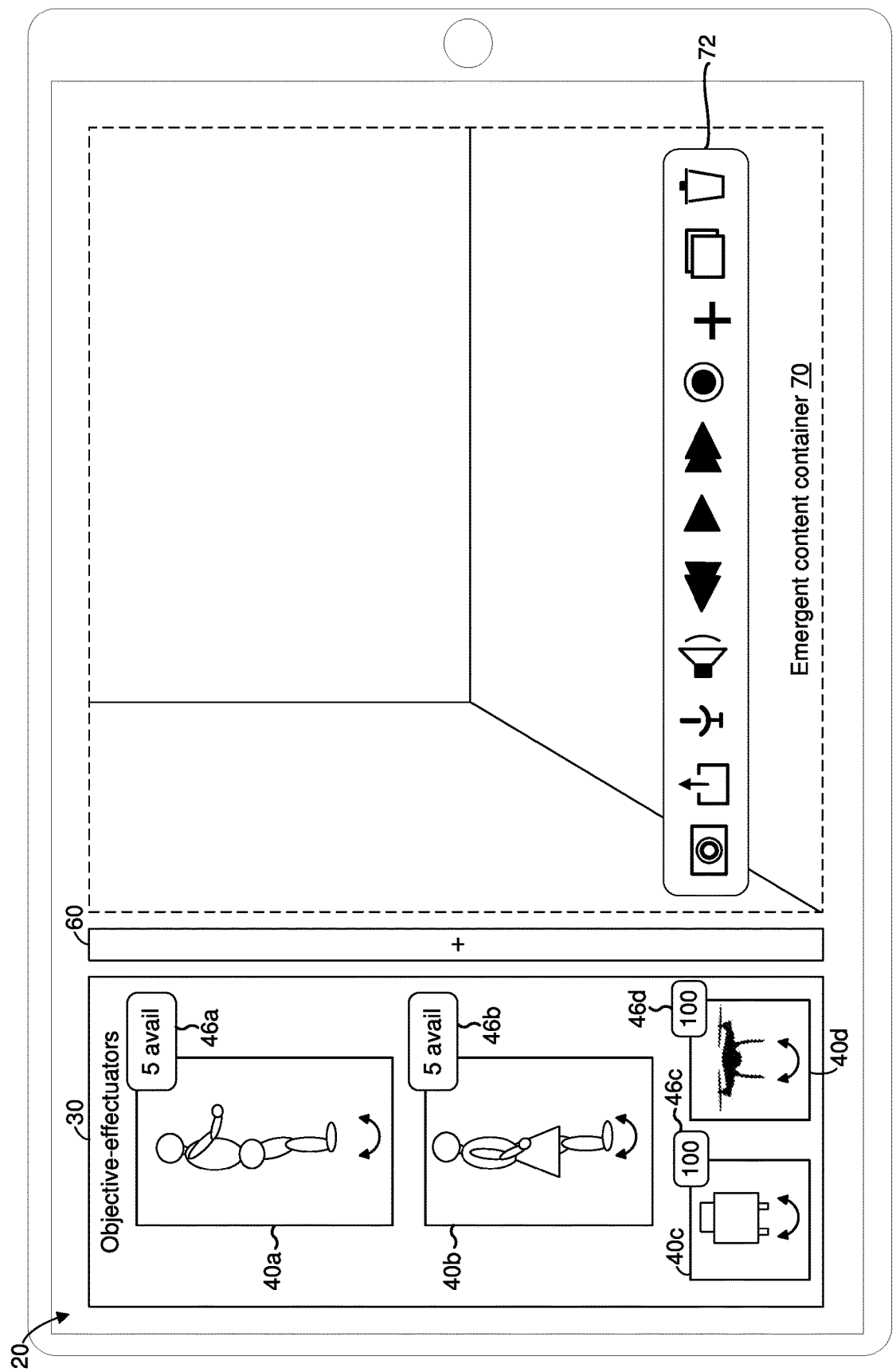

FIG. 1D illustrates an example in which the boy objective-effectuator container 40a, the girl objective-effectuator container 40b, the robot objective-effectuator container 40c and the drone objective-effectuator container 40d are associated with a boy availability indicator 46a, a girl availability indicator 46b, a robot availability indicator 46c and a drone availability indicator 46d, respectively. In some implementations, an availability indicator associated with an objective-effectuator container indicates a number of instances of the corresponding objective-effectuator that are available for instantiation in the emergent content container 70 and other emergent content containers. As indicated by the boy availability indicator 46a, the boy objective-effectuator 42a can be instantiated up to five times between all emergent content containers. As indicated by the girl availability indicator 46b, the girl objective-effectuator 42b can be instantiated up to five times between all emergent content containers. As indicated by the robot availability indicator 46c, the robot objective-effectuator 42c can be instantiated up to one hundred times between all emergent content containers. As indicated by the drone availability indicator 46d, the drone objective-effectuator 42d can be instantiated up to one hundred times between all emergent content containers. In various implementations, an availability indicator associated with an objective-effectuator indicates a scarcity level of the objective-effectuator. In some implementations, a higher value of the availability indicator indicates a higher scarcity level, whereas a lower value of the availability indicator indicates a lower scarcity level. In the example of FIG. 1D, the boy objective-effectuator 42a and the girl objective-effectuator 42b are scarcer than the robot objective-effectuator 42c and the drone objective-effectuator 42d.

Figure 1E:
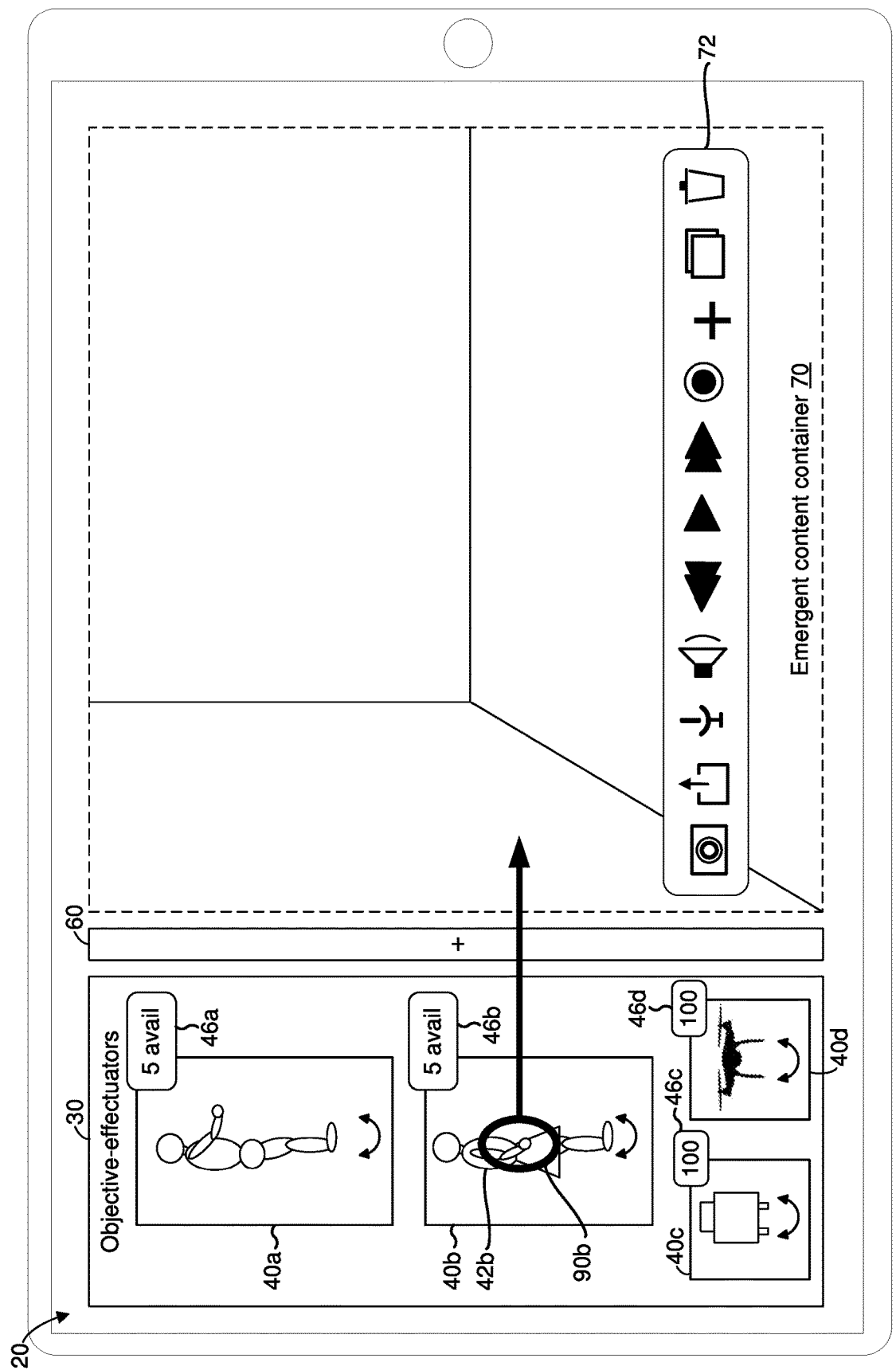
Figure 1F:
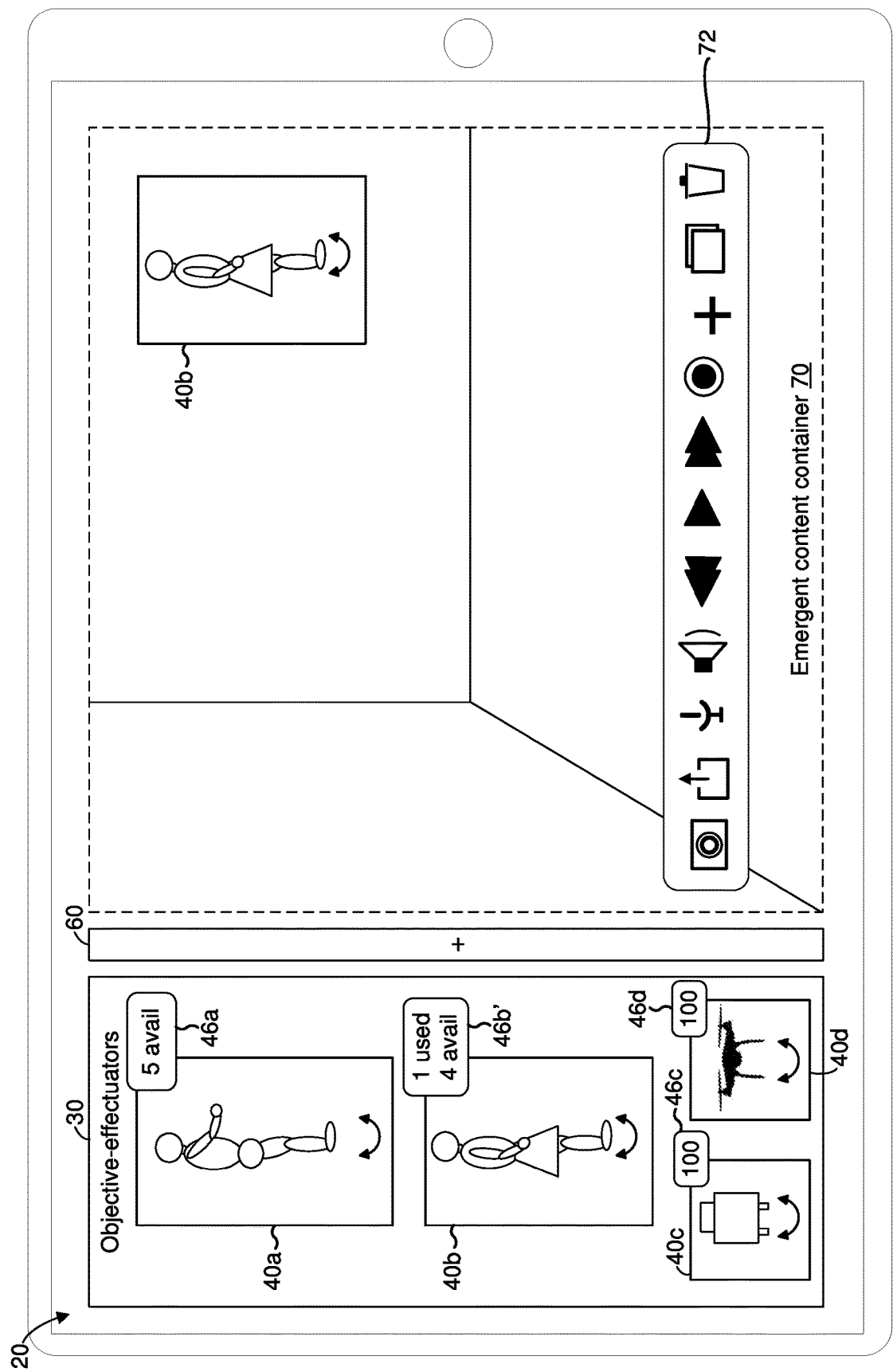

Referring to FIG. 1E, the device 10 detects a user input 90b that corresponds to a request to instantiate the girl objective-effectuator 42b into the emergent content container 70. Referring to FIG. 1F, after detecting the user input 90b shown in FIG. 1E, the device 10 instantiates an instance of the girl objective-effectuator 42b into the emergent content container 70. As illustrated in FIG. 1F, after instantiating an instance of the girl objective-effectuator 42b into the emergent content container 70, the objective-effectuator pane 30 displays an updated girl availability indicator 46b' for the girl objective-effectuator 42b. In the example of FIG. 1F, the updated girl availability indicator 46b' indicates that one instance of the girl objective-effectuator 42b has already been instantiated, and that four instances of the girl objective-effectuator 42b are still available for instantiation.

Figure 1G:
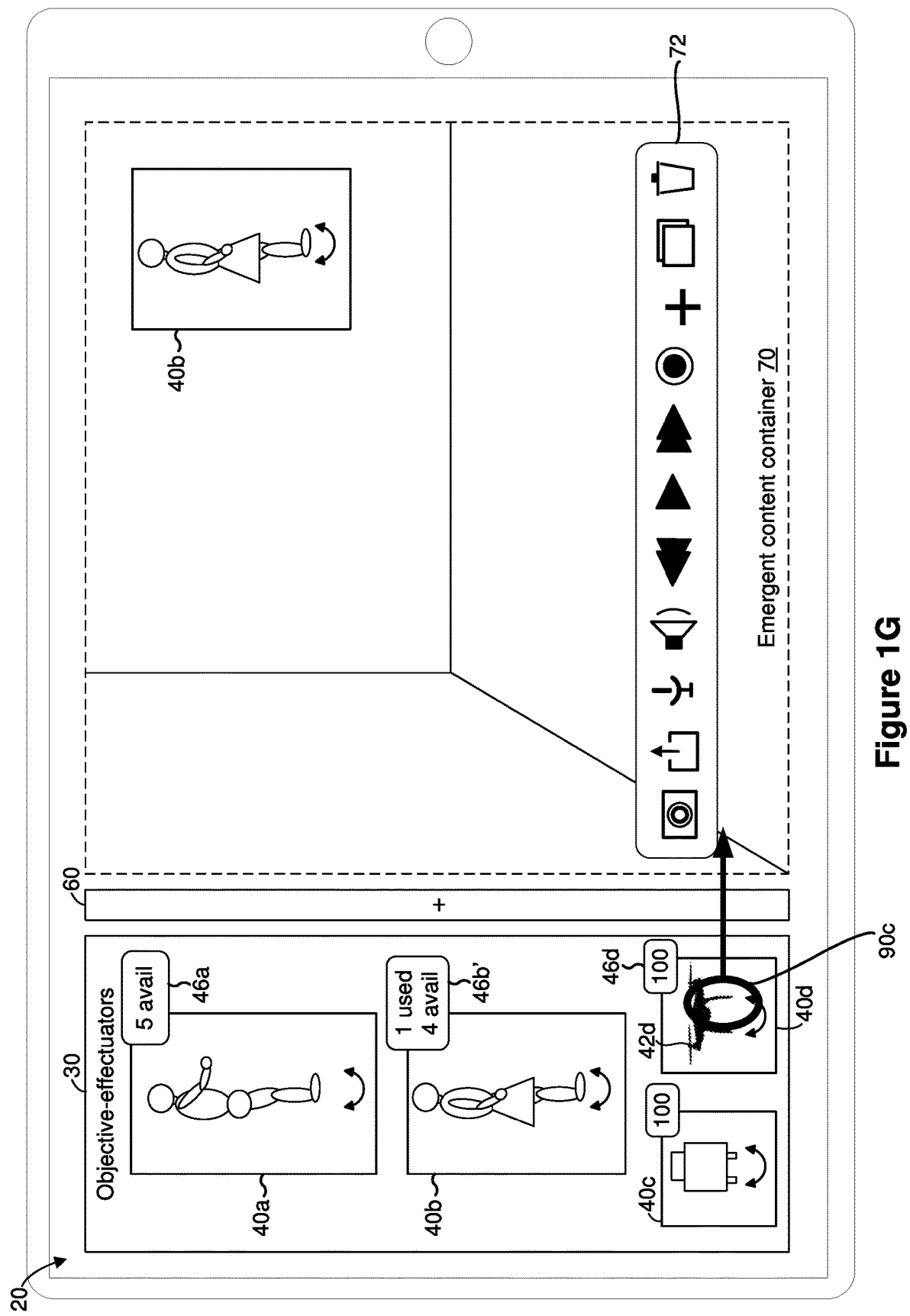
Figure 1H:
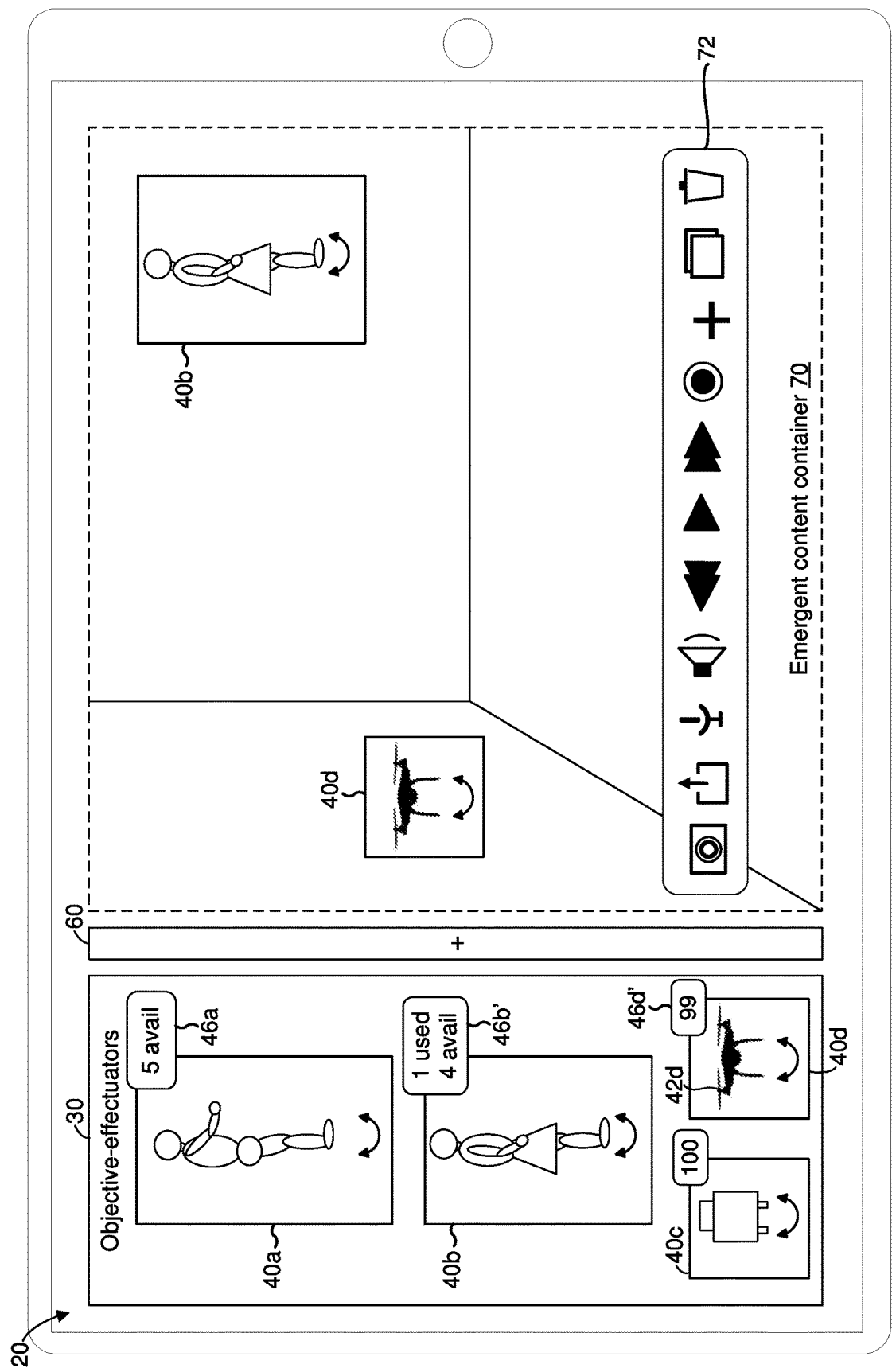

Referring to FIG. 1G, the device 10 detects a user input 90c that corresponds to a request to instantiate the drone objective-effectuator 42d into the emergent content container 70. Referring to FIG. 1H, after detecting the user input 90c shown in FIG. 1G, the device 10 instantiates an instance of the drone objective-effectuator 42d in the emergent content container 70. As illustrated in FIG. 1H, after instantiating an instance of the drone objective-effectuator 42d into the emergent content container 70, the objective-effectuator pane 30 displays an updated drone availability indicator 46d' for the drone objective-effectuator 42d. In the example of FIG. 1H, the updated drone availability indicator 46d' indicates that ninety-nine instances of the drone objective-effectuator 42d are still available for instantiation instead of the hundred that were available in the example of FIG. 1G.

Figure 1I:
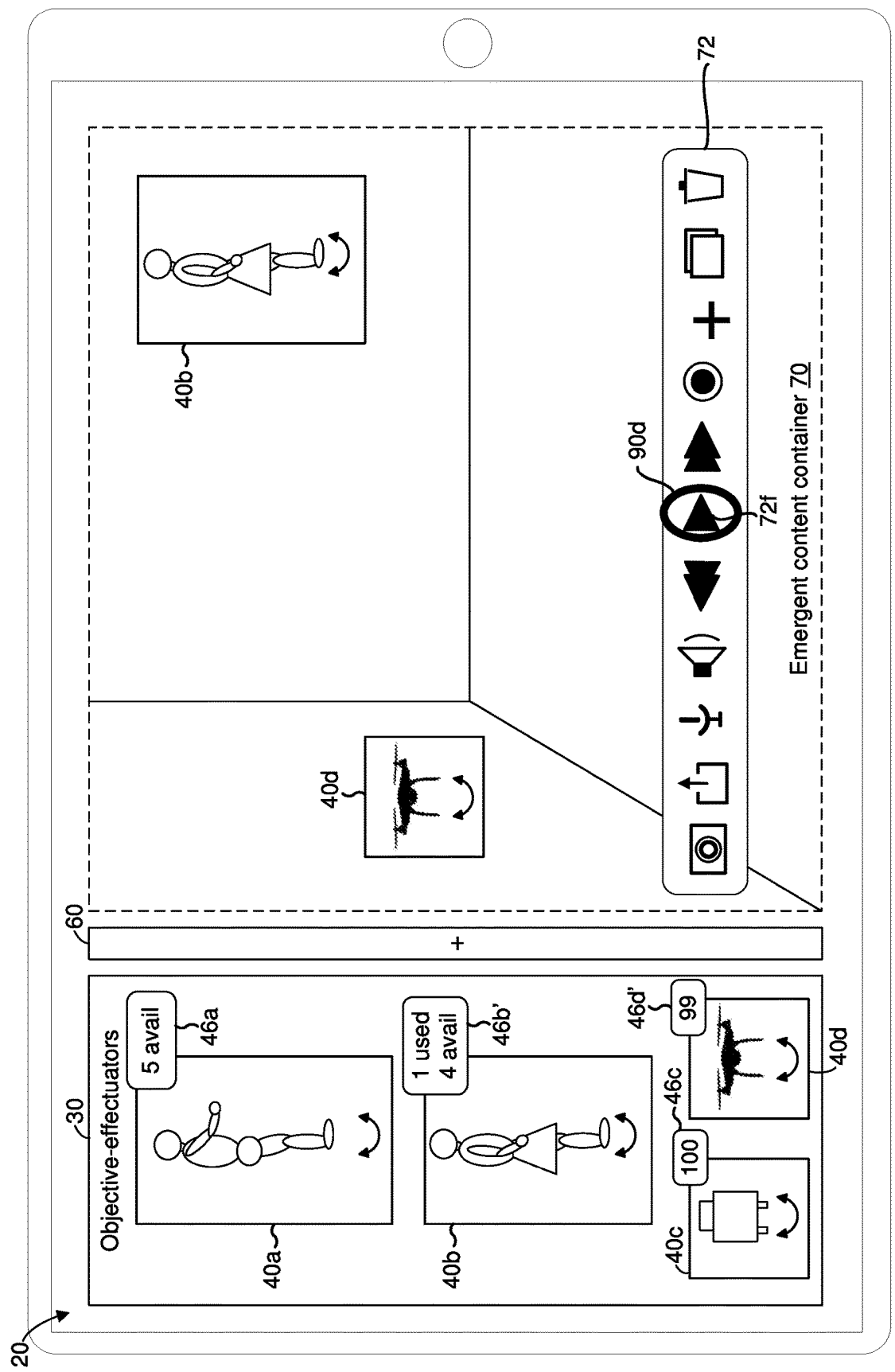
Figure 1J:
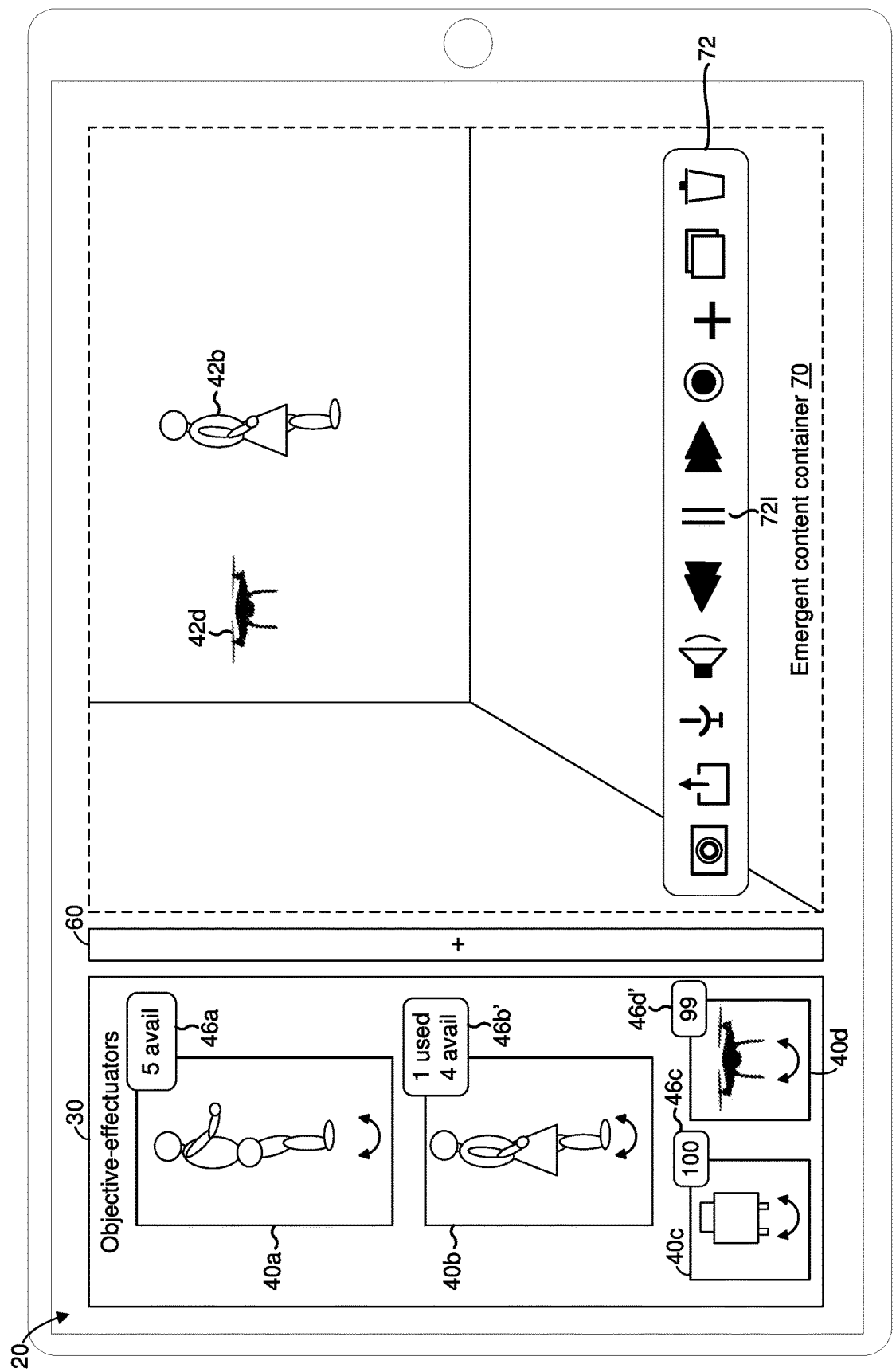

FIGS. 1I-1J illustrate an example in which the emergent content container 70 transitions from edit mode to play mode. In the example of FIG. 1I, the device 10 detects a user input 90d selecting the play affordance 72f Referring to FIG. 1J, in response to detecting the user input 90d shown in FIG. 1I, the emergent content container 70 switches from the edit mode to the play mode. In the play mode, the girl objective-effectuator 42b and the drone objective-effectuator 42d instantiated in the emergent content container 70 start performing actions that satisfy their respective objectives. As illustrated in the example of FIG. 1J, in play mode, the play affordance 72f is replaced by a pause affordance 72l.

Figure 1K:
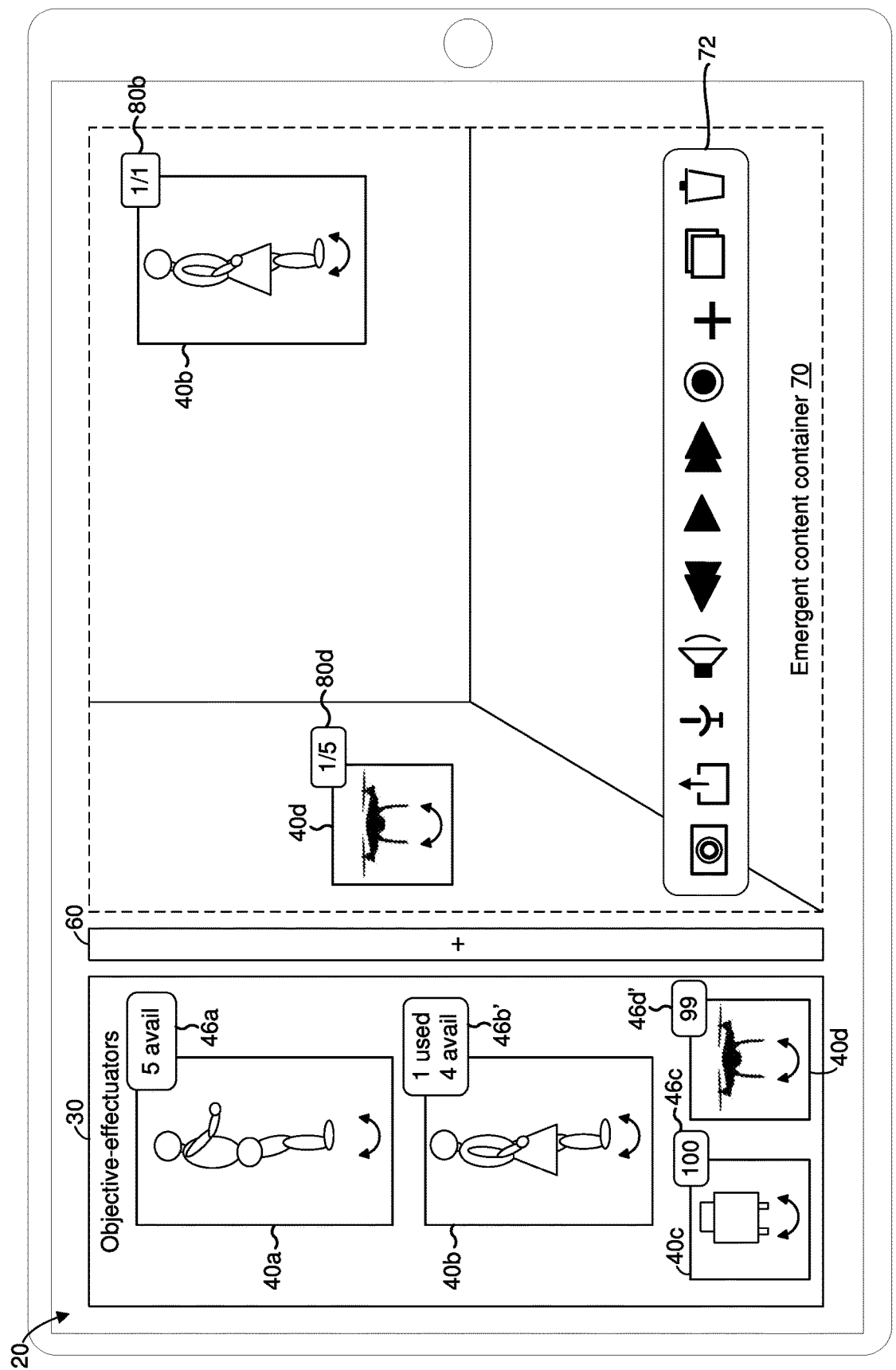
Figure 1L:
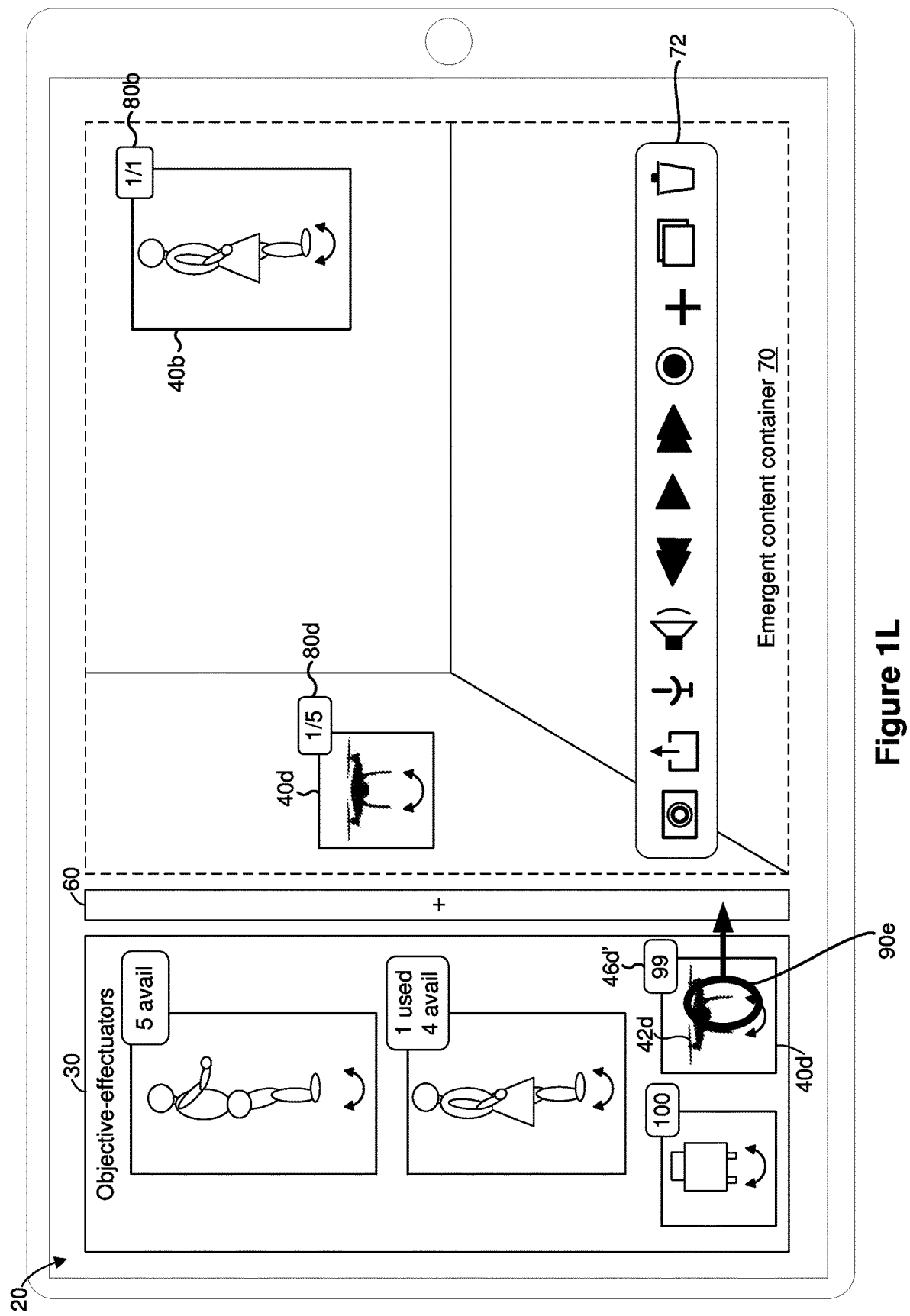
Figure 1M:
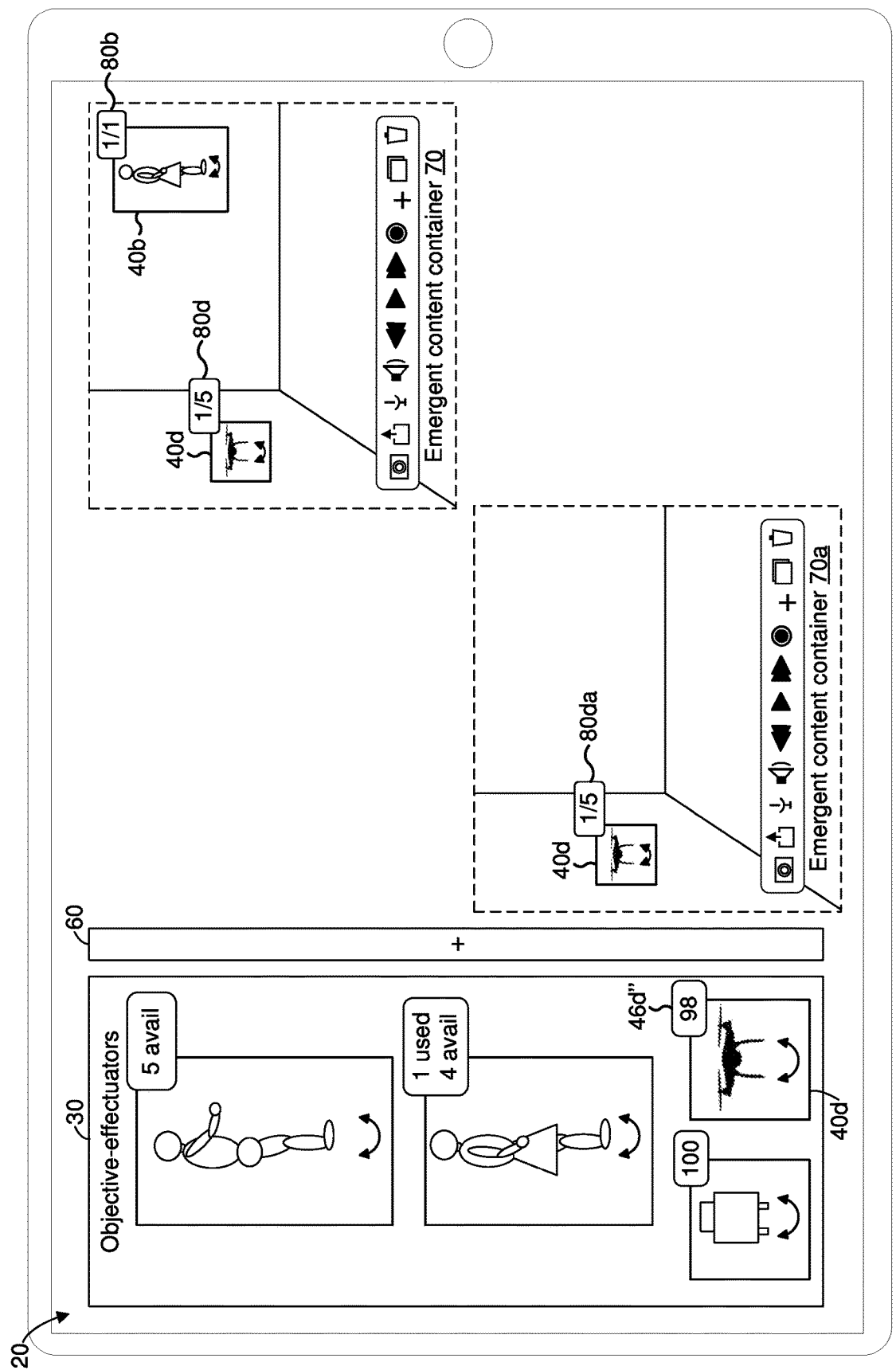
Figure 1N:
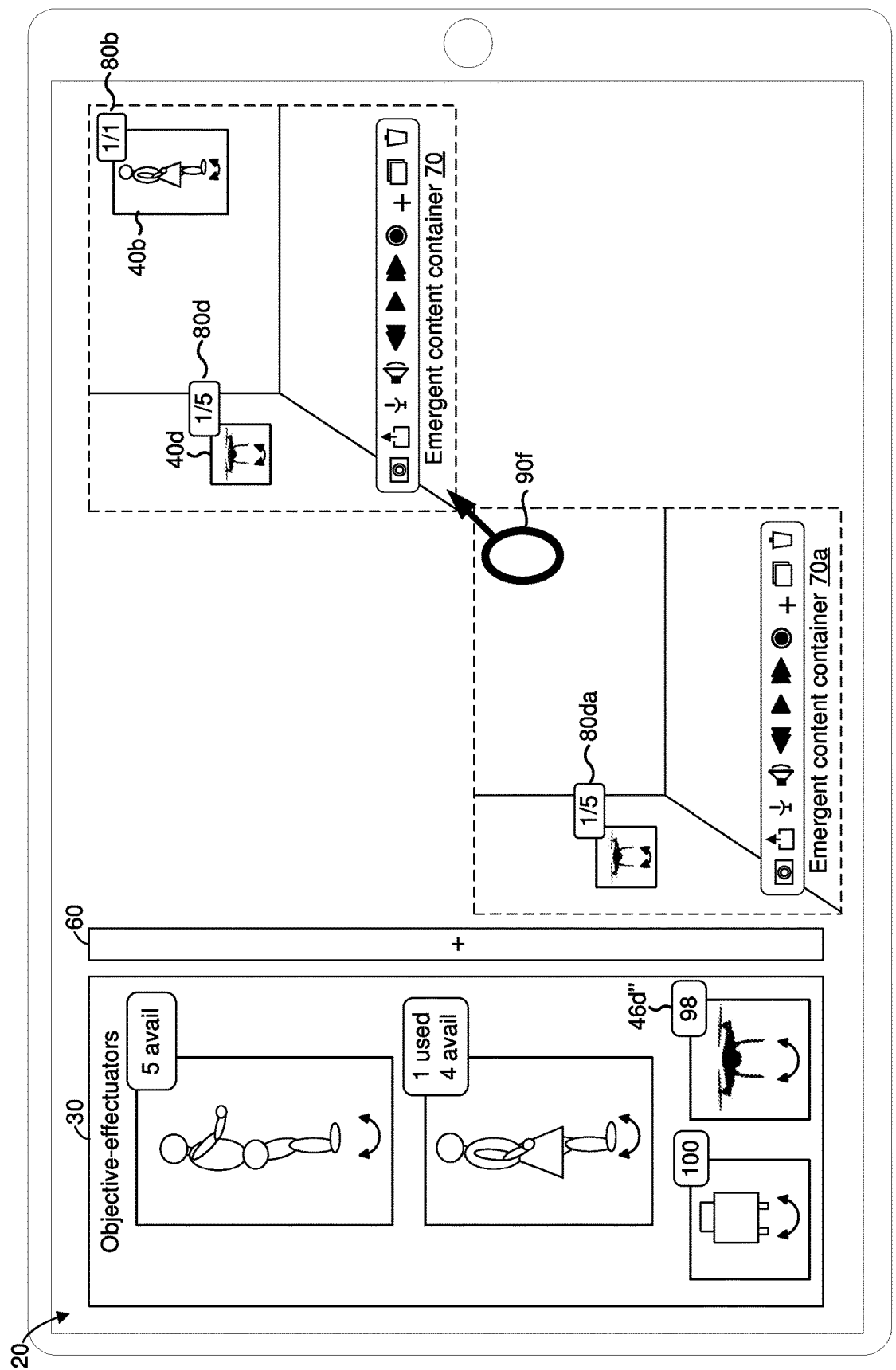
Figure 10:
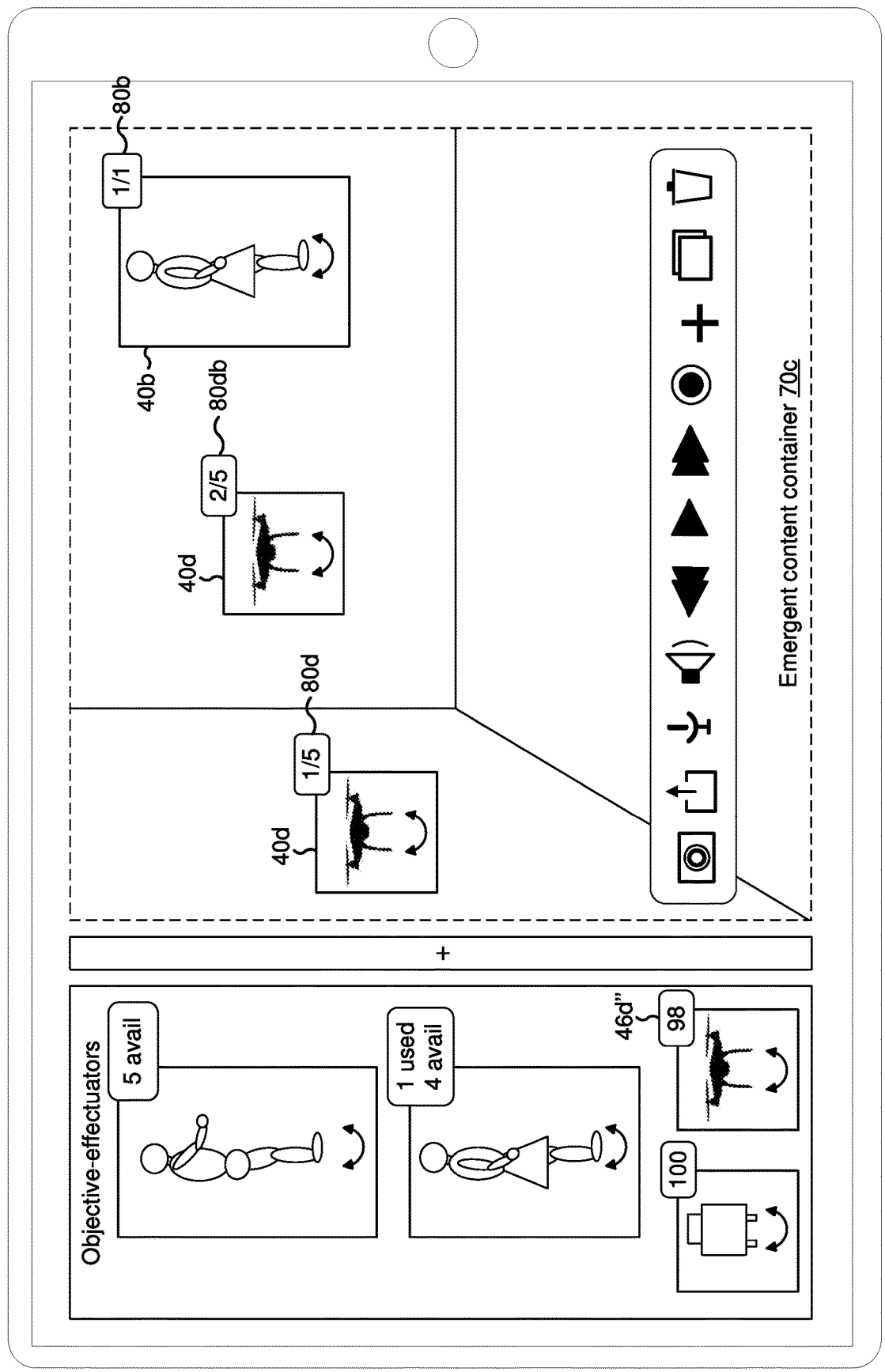

FIG. 1K illustrates an example in which the emergent content container 70 displays a girl usage indicator 80b and a drone usage indicator 80d for the girl objective-effectuator 42b and the drone objective-effectuator 42d, respectively, instantiated in the emergent content container 70. In some implementations, the girl usage indicator 80b indicates a number of instances of the girl objective-effectuator 42b that are instantiated in the emergent content container 70 (e.g., one), and a number of instances of the girl objective-effectuator 42b that are permitted in the emergent content container 70 (e.g., one). In the example of FIG. 1K, additional instances of the girl objective-effectuator 42b cannot be instantiated in the emergent content container 70 because the number of instances instantiated in the emergent content container 70 is the same as the number of instances that are permitted in the emergent content container 70. In some implementations, the drone usage indicator 80d indicates a number of instances of the drone objective-effectuator 42d that are instantiated in the emergent content container 70 (e.g., one), and a number of instances of the drone objective-effectuator 42d that are permitted in the emergent content container 70 (e.g., five). In the example of FIG. 1K, up to four additional instances of the drone objective-effectuator 42d can be instantiated in the emergent content container 70.

Referring to FIG. 1L, the device 10 detects a user input 90e that corresponds to a request to instantiate an instance of the drone objective-effectuator 42d in a new emergent content container. In the example of FIG. 1L, detecting the user input 90e includes detecting that the drone objective-effectuator container 40d has been selected, and that the drone objective-effectuator container 40d is dragged into a display region that corresponds to the new container affordance 60.

Referring to FIG. 1M, in response to detecting the user input 90e shown in FIG. 1L, the device 10 creates a second emergent content container 70a, and instantiates an instance of the drone objective-effectuator 42d in the second emergent content container 70a. The second emergent content container 70a displays a second drone usage indicator 80da for the drone objective-effectuator 42d that is instantiated in the second emergent content container 70a. As illustrated in FIG. 1M, the second drone usage indicator 80da indicates that one out of the five permitted instances of the drone objective-effectuator 42d has been instantiated in the second emergent content container 70b. The objective-effectuator pane 30 displays an updated drone availability indicator 46d" for the drone objective-effectuator 42d to indicate that ninety-eight instances of the drone objective-effectuator 42d can be instantiated instead of the ninety-nine instances shown in the example of FIG. 1L.

Referring to FIG. 1N, the device 10 detects a user input 90f that corresponds to a request to merge the emergent content containers 70 and 70a. In the example of FIG. 1N, detecting the user input 90f includes detecting that the second emergent content container 70a has been selected, and that the second emergent content container 70a is being dragged towards and/or into the emergent content container 70.

Referring to FIG. 1O, in response to detecting the user input 90f shown in FIG. 1N, the device 10 merges the emergent content containers 70 and 70a shown in FIG. 1N to form a merged emergent content container 70c. The merged emergent content container 70c includes objective-effectuators that were instantiated in the emergent content containers 70 and 70a shown in FIG. 1N. For example, as illustrated in FIG. 1O, the merged emergent content container 70c includes one instance of the girl objective-effectuator 42b from the emergent content container 70 shown in FIG. 1N, one instance of the drone objective-effectuator 42d from the emergent content container 70 shown in FIG. 1N, and another instance of the drone objective effectuator from the second emergent content container 70a shown in FIG. 1N. As illustrated in FIG. 1O, the merged emergent content container 70c includes an updated drone usage indicator 80db to indicate that two out of the five permitted instances of the drone objective-effectuator 42d are already instantiated in the merged emergent content container 70c.

Figure 1P:
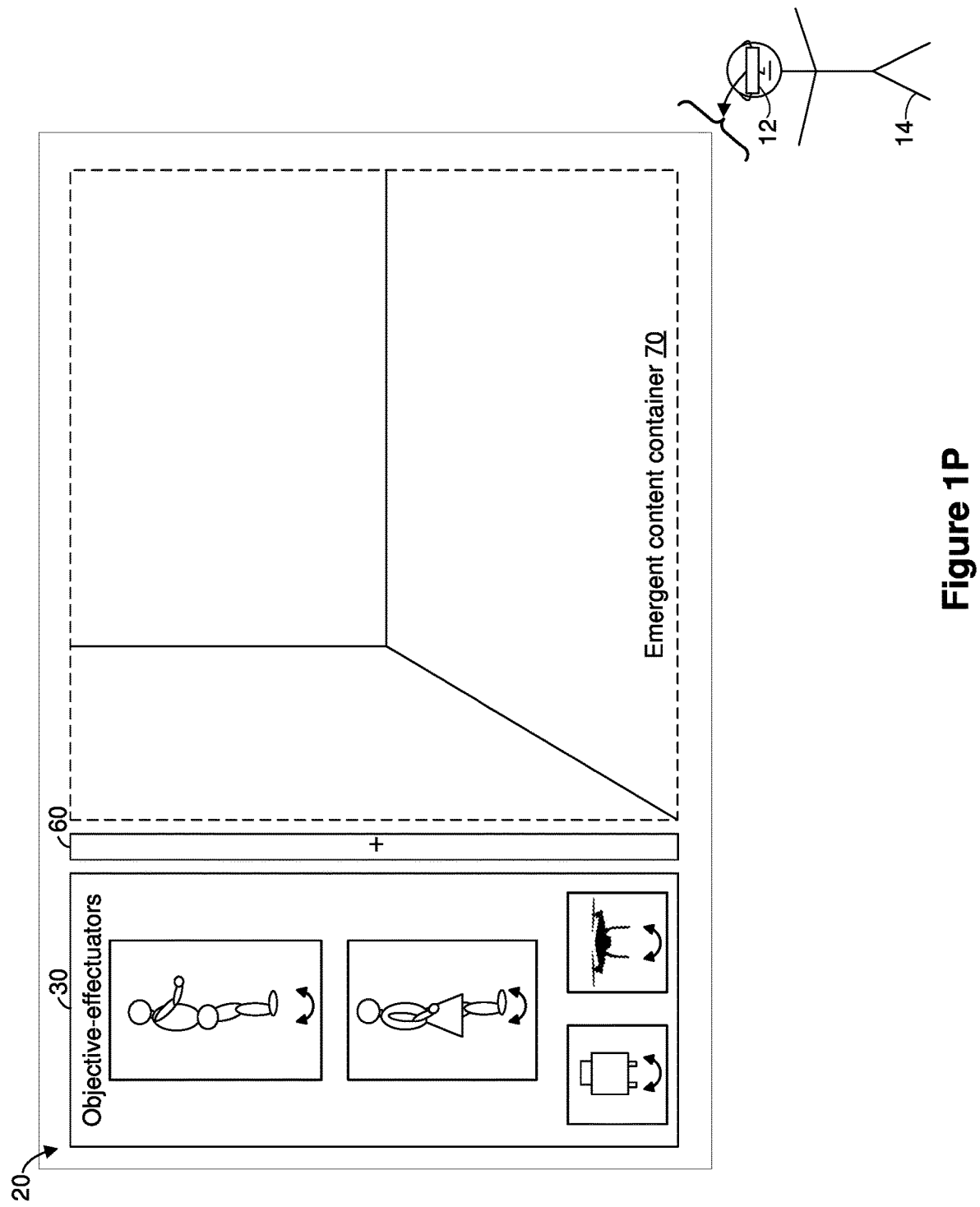

Referring to FIG. 1P, a head-mountable device (HMD) 12, being worn by a user 14, presents (e.g., displays) the user interface 20 (e.g., a CGR environment) according to various implementations. In some implementations, the HMD 12 includes an integrated display (e.g., a built-in display) that displays the user interface 20. In some implementations, the HMD 12 includes a head-mountable enclosure. In various implementations, the head-mountable enclosure includes an attachment region to which another device with a display can be attached. For example, in some implementations, the device 10 can be attached to the head-mountable enclosure. In various implementations, the head-mountable enclosure is shaped to form a receptacle for receiving another device that includes a display (e.g., the device 10). For example, in some implementations, the device 10 slides/snaps into or otherwise attaches to the head-mountable enclosure. In some implementations, the display of the device attached to the head-mountable enclosure presents (e.g., displays) the user interface 20. In various implementations, examples of the device 10 include smartphones, tablets, media players, laptops, etc.

Figure 2:
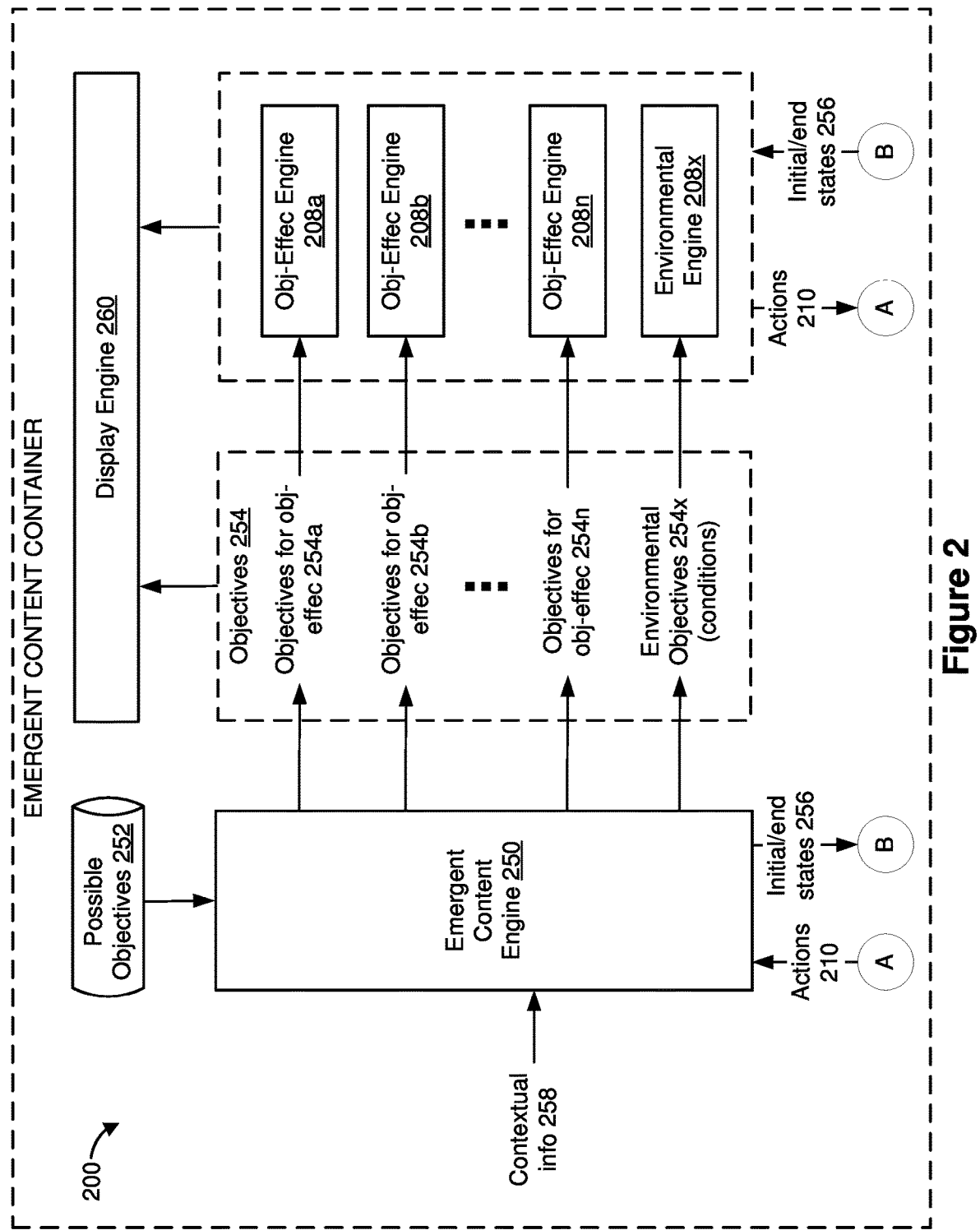
FIG. 2 is a block diagram of an example system in accordance with some implementations.

FIG. 2 is a block diagram of an example system 200. In some implementations, the system 200 represents an implementation of the emergent content container 70 shown in FIGS. 1A-1N. In some implementations, the system 200 includes various objective-effectuator engines (e.g., a first objective-effectuator engine 208a, a second objective-effectuator engine 208b . . . and an nth objective-effectuator engine) that generate actions 210 for respective objective-effectuators instantiated in an emergent content container (e.g., the emergent content container 70 shown in FIGS. 1A-1N). In some implementations, the system 200 includes an environmental engine 208x that generates actions 210 in the form of environmental responses. In some implementations, the system 200 includes an emergent content engine 250 that generates objectives 254 for the various objective-effectuator engines 208a, 208b . . . 208n and the environmental engine 208x. For example, as illustrated in FIG. 2, the emergent content engine 250 generates a first set of objectives 254a for the first objective-effectuator engine 208a, a second set of objectives 254b for the second objective-effectuator engine 208b . . . and an nth set of objectives 254n for the nth objective-effectuator engine 208n. In some implementations, the emergent content engine 250 generates environmental objectives 254x (e.g., environmental conditions) for the environmental engine 208x.

In various implementations, the emergent content engine 250 generates respective objectives 254 for objective-effectuators that are instantiated in one or more emergent content containers (e.g. the emergent content container 70 shown in FIGS. 1A-1N and/or the second emergent content container 70a shown in FIGS. 1M-1N). For example, in some implementations, the first set of objectives 254a are for the girl objective-effectuator 42b instantiated in the merged emergent content container 70c shown in FIG. 1O, the second set of objectives 254b are for the first instance of the drone objective-effectuator 42d instantiated in the merged emergent content container 70c, the nth set of objectives 254n are for the second instance of the drone objective-effectuator 42d instantiated in the merged emergent content container 70c, and the environmental objectives 254x are for the environment of the merged emergent content container 70c.

In various implementations, the emergent content engine 250 generates the objectives 254 based on a function of possible objectives 252 (e.g., a set of predefined objectives), contextual information 258 characterizing the emergent content container, and actions 210 provided by the objective-effectuator/environmental engines. For example, in some implementations, the emergent content engine 250 generates the objectives 254 by selecting the objectives 254 from the possible objectives 252 based on the contextual information 258 and/or the actions 210. In some implementations, the possible objectives 252 are stored in a datastore. In some implementations, the possible objectives 252 are obtained from corresponding fictional source material (e.g., by scraping video games, movies, novels, and/or comics). For example, in some implementations, the possible objectives 252 for the girl objective-effectuator 42d shown in FIGS. 1A-1O include saving lives, rescuing pets, fighting crime, etc.

In some implementations, the emergent content engine 250 generates the objectives 254 based on the actions 210 provided by the objective-effectuator/environmental engines. In some implementations, the emergent content engine 250 generates the objectives 254 such that, given the actions 210, a probability of completing the objectives 254 satisfies a threshold (e.g., the probability is greater than the threshold, for example, the probability is greater than 80%). In some implementations, the emergent content engine 250 generates objectives 254 that have a high likelihood of being completed with the actions 210.

In some implementations, the emergent content engine 250 ranks the possible objectives 252 based on the actions 210. In some implementations, a rank for a particular possible objective 252 indicates the likelihood of completing that particular possible objective 252 given the actions 210. In such implementations, the emergent content engine 250 generates the objective 254 by selecting the highest N ranking possible objectives 252, where N is a predefined integer (e.g., 1, 3, 5, 10, etc.).

In some implementations, the emergent content engine 250 establishes initial/end states 256 for the emergent content container(s) based on the objectives 254. In some implementations, the initial/end states 256 indicate placements (e.g., locations) of various objective-effectuators within the emergent content container(s). In some implementations, the emergent content container is associated with a time duration (e.g., a few seconds, minutes, hours, or days). For example, the emergent content container is scheduled to last for the time duration. In such implementations, the initial/end states 256 indicate placements of various objective-effectuators at/towards the beginning and/or at/towards the end of the time duration. In some implementations, the initial/end states 256 indicate environmental conditions for the emergent content container at/towards the beginning/end of the time duration associated with the emergent content container.

In some implementations, the emergent content engine 250 provides the objectives 254 to the display engine 260 in addition to the objective-effectuator/environmental engines. In some implementations, the display engine 260 determines whether the actions 210 provided by the objective-effectuator/environmental engines are consistent with the objectives 254 provided by the emergent content engine 250. For example, the display engine 260 determines whether the actions 210 satisfy objectives 254. In other words, in some implementations, the display engine 260 determines whether the actions 210 improve the likelihood of completing/achieving the objectives 254. In some implementations, if the actions 210 satisfy the objectives 254, then the display engine 260 modifies the emergent content containers in accordance with the actions 210. In some implementations, if the actions 210 do not satisfy the objectives 254, then the display engine 260 forgoes modifying the emergent content container(s) in accordance with the actions 210.

Figure 3A:
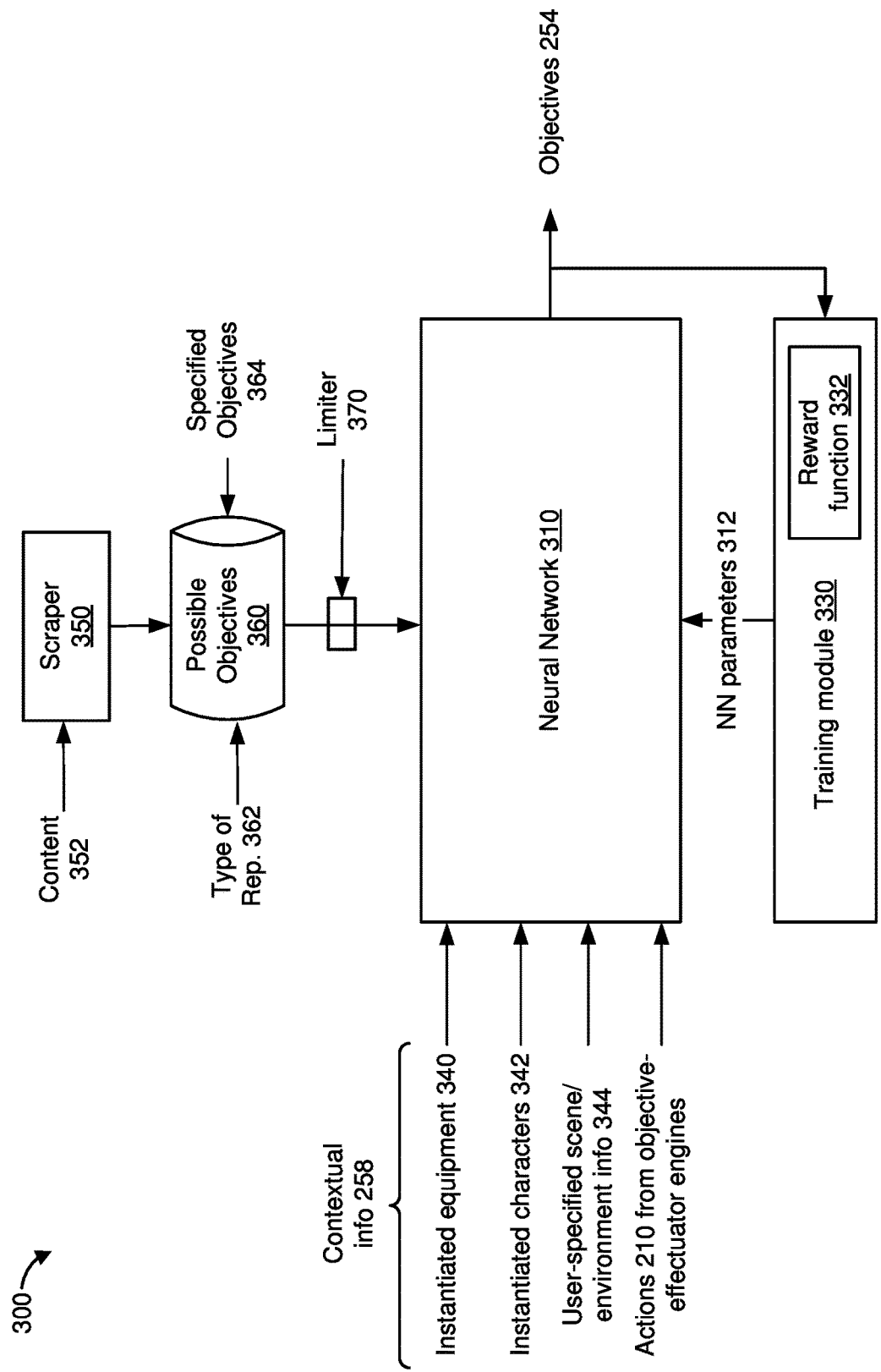
FIG. 3A is a block diagram of an example emergent content engine in accordance with some implementations.

FIG. 3A is a block diagram of an example emergent content engine 300 in accordance with some implementations. In some implementations, the emergent content engine 300 implements the emergent content engine 250 shown in FIG. 2. In various implementations, the emergent content engine 300 generates the objectives 254 for various objective-effectuators that are instantiated in one or more emergent content containers (e.g., objective-effectuators such as the girl objective-effectuator 42b instantiated in the emergent content container 70 shown in FIG. 1C). In some implementations, at least some of the objectives 254 are for an environmental engine (e.g., the environmental engine 208e shown in FIG. 2) that affects an environment of the emergent content container.

In various implementations, the emergent content engine 300 includes a neural network system 310 ("neural network 310", hereinafter for the sake of brevity), a neural network training system 330 ("a training module 330", hereinafter for the sake of brevity) that trains (e.g., configures) the neural network 310, and a scraper 350 that provides possible objectives 360 to the neural network 310. In various implementations, the neural network 310 generates the objectives 254 (e.g., the first set of objectives 254a, the second set of objectives 254b . . . and/or the nth set of objectives 254n, and/or the environmental objectives 254x shown in FIG. 2).

In some implementations, the neural network 310 includes a long short-term memory (LSTM) recurrent neural network (RNN). In various implementations, the neural network 310 generates the objectives 254 based on a function of the possible objectives 360. For example, in some implementations, the neural network 310 generates the objectives 254 by selecting a portion of the possible objectives 360. In some implementations, the neural network 310 generates the objectives 254 such that the objectives 254 are within a degree of similarity to the possible objectives 360.

In various implementations, the neural network 310 generates the objectives 254 based on the contextual information 258 characterizing the emergent content container. As illustrated in FIG. 3A, in some implementations, the contextual information 258 indicates instantiated objective-effectuators (e.g., instantiated equipment objective-effectuators 340, instantiated character objective-effectuators 342, user-specified scene/environment information 344, and/or actions 210 from objective-effectuator engines).

In some implementations, the neural network 310 generates the objectives 254 based on the instantiated equipment objective-effectuators 340 (e.g., the drone objective-effectuator 42d instantiated in the emergent content container 70 shown in FIG. 1H). In some implementations, the instantiated equipment objective-effectuators 340 refer to equipment objective-effectuators that are instantiated in the emergent content container. In some implementations, the objectives 254 include interacting with one or more of the instantiated equipment objective-effectuators 340. For example, referring to FIG. 1H, in some implementations, one of the objectives for the girl objective-effectuator 42b includes destroying the drone objective-effectuator 42d.

In some implementations, the neural network 310 generates the objectives 254 for each character objective-effectuator based on the instantiated equipment objective-effectuators 340. For example, referring to FIG. 1H, since the emergent content container 70 includes the drone objective-effectuator 42d, one of the objectives for the girl objective-effectuator 42b includes destroying the drone objective-effectuator f42d. However, if the emergent content container 70 did not include the drone objective-effectuator 42d, then the objective for the girl objective-effectuator 42b would include maintaining peace within the emergent content container 70.

In some implementations, the neural network 310 generates objectives 254 for each equipment objective-effectuator based on the other equipment objective-effectuators that are instantiated in the emergent content container. For example, referring to FIG. 1A, if the emergent content container 70 includes the robot objective-effectuator 42c, then one of the objectives for the drone objective-effectuator 42d includes protecting the robot objective-effectuator 42c. However, if the emergent content container 70 does not include the robot objective-effectuator 42c, then the objective for the drone objective-effectuator 42d includes hovering at the center of the emergent content container 70.

In some implementations, the neural network 310 generates the objectives 254 based on the instantiated character objective-effectuators 342. In some implementations, the instantiated character objective-effectuators 342 refer to character objective-effectuators that are located in the emergent content container. For example, referring to FIG. 1C, the instantiated character objective-effectuators 342 include the girl objective-effectuator 42b in the emergent content container 70. In some implementations, the objectives 254 include interacting with one or more of the instantiated character objective-effectuators 342. For example, referring to FIG. 1H, in some implementations, one of the objectives for the drone objective-effectuator 42d includes following the girl objective-effectuator 42b. Similarly, in some implementations, one of the objectives for the robot objective-effectuator 42c include avoiding the boy objective-effectuator 42a.

In some implementations, the neural network 310 generates the objectives 254 for each character objective-effectuator based on the other character objective-effectuators that are instantiated in the emergent content container. For example, referring to FIG. 1A, if the emergent content container 70 includes the boy objective-effectuator 42a, then one of the objectives for the girl objective-effectuator 42b includes catching the boy objective-effectuator 42a. However, if the emergent content container 70 does not include the boy objective-effectuator 42a, then the objective for the girl objective-effectuator 42b includes flying around the emergent content container 70.

In some implementations, the neural network 310 generates objectives 254 for each equipment objective-effectuator based on the character objective-effectuators that are instantiated in the emergent content container. For example, referring to FIG. 1A, if the emergent content container 70 includes the girl objective-effectuator 42b, then one of the objectives for the drone objective-effectuator 42d includes following the girl objective-effectuator 42b. However, if the emergent content container 70 does not include the girl objective-effectuator 42b, then the objective for the drone objective-effectuator 42d includes hovering at the center of the emergent content container 70.

In some implementations, the neural network 310 generates the objectives 254 based on the user-specified scene/environment information 344. In some implementations, the user specified scene/environment information 344 indicates boundaries of the emergent content container. In such implementations, the neural network 310 generates the objectives 254 such that the objectives 254 can be satisfied (e.g., achieved) within the boundaries of emergent content container. In some implementations, the neural network 310 generates the objectives 254 by selecting a portion of the possible objectives 252 that are better suited for the environment indicated by the user-specified scene/environment information 344. For example, the neural network 310 sets one of the objectives for the drone objective-effectuator 42d to hover over the boy objective-effectuator 42a when the user-specified scene/environment information 344 indicates that the skies within the emergent content container 70 are clear. In some implementations, the neural network 310 forgoes selecting a portion of the possible objectives 252 that are not suitable for the environment indicated by the user-specified scene/environment information 344. For example, the neural network 310 forgoes the hovering objective for the drone objective-effectuator 42d when the user-specified scene/environment information 344 indicates high winds within the emergent content container 70.

In some implementations, the neural network 310 generates the objectives 254 based on the actions 210 provided by various objective-effectuator engines. In some implementations, the neural network 310 generates the objectives 254 such that the objectives 254 can be satisfied (e.g., achieved) given the actions 210 provided by the objective-effectuator engines. In some implementations, the neural network 310 evaluates the possible objectives 360 with respect to the actions 210. In such implementations, the neural network 310 generates the objectives 360 by selecting the possible objectives 360 that can be satisfied by the actions 210 and forgoing selecting the possible objectives 360 that cannot be satisfied by the actions 210.

In various implementations, the training module 330 trains the neural network 310. In some implementations, the training module 330 provides neural network (NN) parameters 312 to the neural network 310. In some implementations, the neural network 310 includes model(s) of neurons, and the neural network parameters 312 represent weights for the model(s). In some implementations, the training module 330 generates (e.g., initializes or initiates) the neural network parameters 312, and refines (e.g., adjusts) the neural network parameters 312 based on the objectives 254 generated by the neural network 310.

In some implementations, the training module 330 includes a reward function 332 that utilizes reinforcement learning to train the neural network 310. In some implementations, the reward function 332 assigns a positive reward to objectives 254 that are desirable, and a negative reward to objectives 254 that are undesirable. In some implementations, during a training phase, the training module 330 compares the objectives 254 with verification data that includes verified objectives. In such implementations, if the objectives 254 are within a degree of similarity to the verified objectives, then the training module 330 stops training the neural network 310. However, if the objectives 254 are not within the degree of similarity to the verified objectives, then the training module 330 continues to train the neural network 310. In various implementations, the training module 330 updates the neural network parameters 312 during/after the training.

In various implementations, the scraper 350 scrapes content 352 to identify the possible objectives 360. In some implementations, the content 352 includes movies, video games, comics, novels, and fan-created content such as blogs and commentary. In some implementations, the scraper 350 utilizes various methods, systems and/or, devices associated with content scraping to scrape the content 352. For example, in some implementations, the scraper 350 utilizes one or more of text pattern matching, HTML (Hyper Text Markup Language) parsing, DOM (Document Object Model) parsing, image processing and audio analysis to scrape the content 352 and identify the possible objectives 360.

In some implementations, an objective-effectuator is associated with a type of representation 362, and the neural network 310 generates the objectives 254 based on the type of representation 362 associated with the objective-effectuator. In some implementations, the type of representation 362 indicates physical characteristics of the objective-effectuator (e.g., color, material type, texture, etc.). In such implementations, the neural network 310 generates the objectives 254 based on the physical characteristics of the objective-effectuator. In some implementations, the type of representation 362 indicates behavioral characteristics of the objective-effectuator (e.g., aggressiveness, friendliness, etc.). In such implementations, the neural network 310 generates the objectives 254 based on the behavioral characteristics of the objective-effectuator. In some implementations, the type of representation 362 indicates functional and/or performance characteristics of the objective-effectuator (e.g., strength, speed, flexibility, etc.). In such implementations, the neural network 310 generates the objectives 254 based on the functional characteristics of the objective-effectuator. In some implementations, the type of representation 362 is determined based on a user input. In some implementations, the type of representation 362 is determined based on a combination of rules.

In some implementations, the neural network 310 generates the objectives 254 based on specified objectives 364. In some implementations, the specified objectives 364 are provided by an entity that controls (e.g., owns or created) the fictional material from where the character/equipment originated. For example, in some implementations, the specified objectives 364 are provided by a movie producer, a video game creator, a novelist, etc. In some implementations, the possible objectives 360 include the specified objectives 364. As such, in some implementations, the neural network 310 generates the objectives 254 by selecting a portion of the specified objectives 364.

In some implementations, the possible objectives 360 for an objective-effectuator are limited by a limiter 370. In some implementations, the limiter 370 restricts the neural network 310 from selecting a portion of the possible objectives 360. In some implementations, the limiter 370 is controlled by the entity that owns (e.g., controls) the fictional material from where the character/equipment originated. For example, in some implementations, the limiter 370 is controlled by a movie producer, a video game creator, a novelist, etc. In some implementations, the limiter 370 and the neural network 310 are controlled/operated by different entities. In some implementations, the limiter 370 restricts the neural network 310 from generating objectives that breach a criterion defined by the entity that controls the fictional material.

Figure 3B:
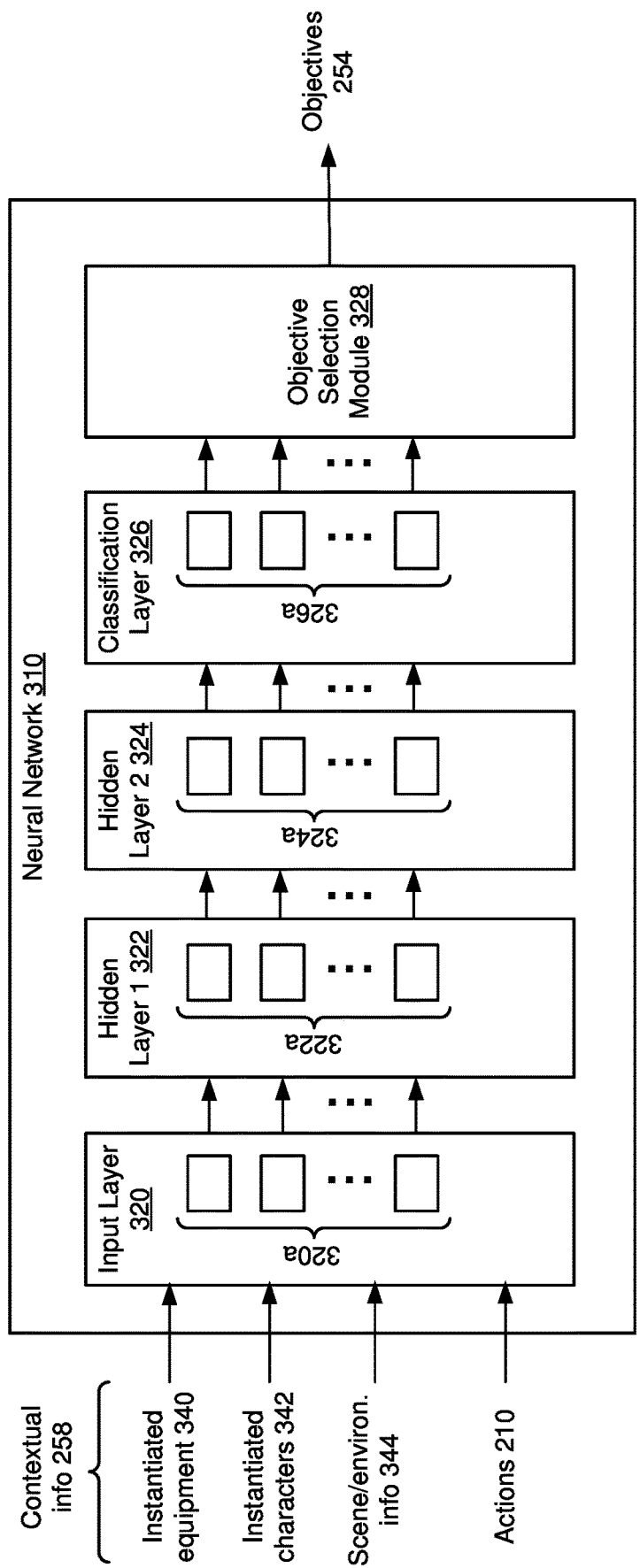
FIG. 3B is a block diagram of an example neural network in accordance with some implementations.

FIG. 3B is a block diagram of the neural network 310 in accordance with some implementations. In the example of FIG. 3B, the neural network 310 includes an input layer 320, a first hidden layer 322, a second hidden layer 324, a classification layer 326, and an objective selection module 328. While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 receives various inputs. In some implementations, the input layer 320 receives the contextual information 258 as input. In the example of FIG. 3B, the input layer 320 receives inputs indicating the instantiated equipment objective-effectuators 340, the instantiated character objective-effectuators 342, the user-specified scene/environment information 344, and the actions 210 from the objective-effectuator engines. In some implementations, the neural network 310 includes a feature extraction module (not shown) that generates a feature stream (e.g., a feature vector) based on the instantiated equipment objective-effectuators 340, the instantiated character objective-effectuators 342, the user-specified scene/environment information 344, and/or the actions 210. In such implementations, the feature extraction module provides the feature stream to the input layer 320. As such, in some implementations, the input layer 320 receives a feature stream that is a function of the instantiated equipment objective-effectuators 340, the instantiated character objective-effectuators 342, the user-specified scene/environment information 344, and the actions 210. In various implementations, the input layer 320 includes a number of LSTM logic units 320a, which are also referred to as neurons or models of neurons by those of ordinary skill in the art. In some such implementations, an input matrix from the features to the LSTM logic units 320a includes rectangular matrices. The size of this matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3B, the first hidden layer 322 receives its inputs from the input layer 320.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322 or the number of LSTM logic units 324a in the second hidden layer 324. In some implementations, the classification layer 326 includes an implementation of a multinomial logistic function (e.g., a soft-max function) that produces a number of outputs that is approximately equal to the number of possible actions 360. In some implementations, each output includes a probability or a confidence measure of the corresponding objective being satisfied by the actions 210. In some implementations, the outputs do not include objectives that have been excluded by operation of the limiter 370.

In some implementations, the objective selection module 328 generates the objectives 254 by selecting the top N objective candidates provided by the classification layer 326. In some implementations, the top N objective candidates are likely to be satisfied by the actions 210. In some implementations, the objective selection module 328 provides the objectives 254 to a rendering and display pipeline (e.g., the display engine 260 shown in FIG. 2). In some implementations, the objective selection module 328 provides the objectives 254 to one or more objective-effectuator engines (e.g., the first objective-effectuator engine 208a, the second objective-effectuator engine 208b . . . and/or the nth objective-effectuator engine 208n, and/or the environmental engine 208x shown in FIG. 2).

Figure 4A:
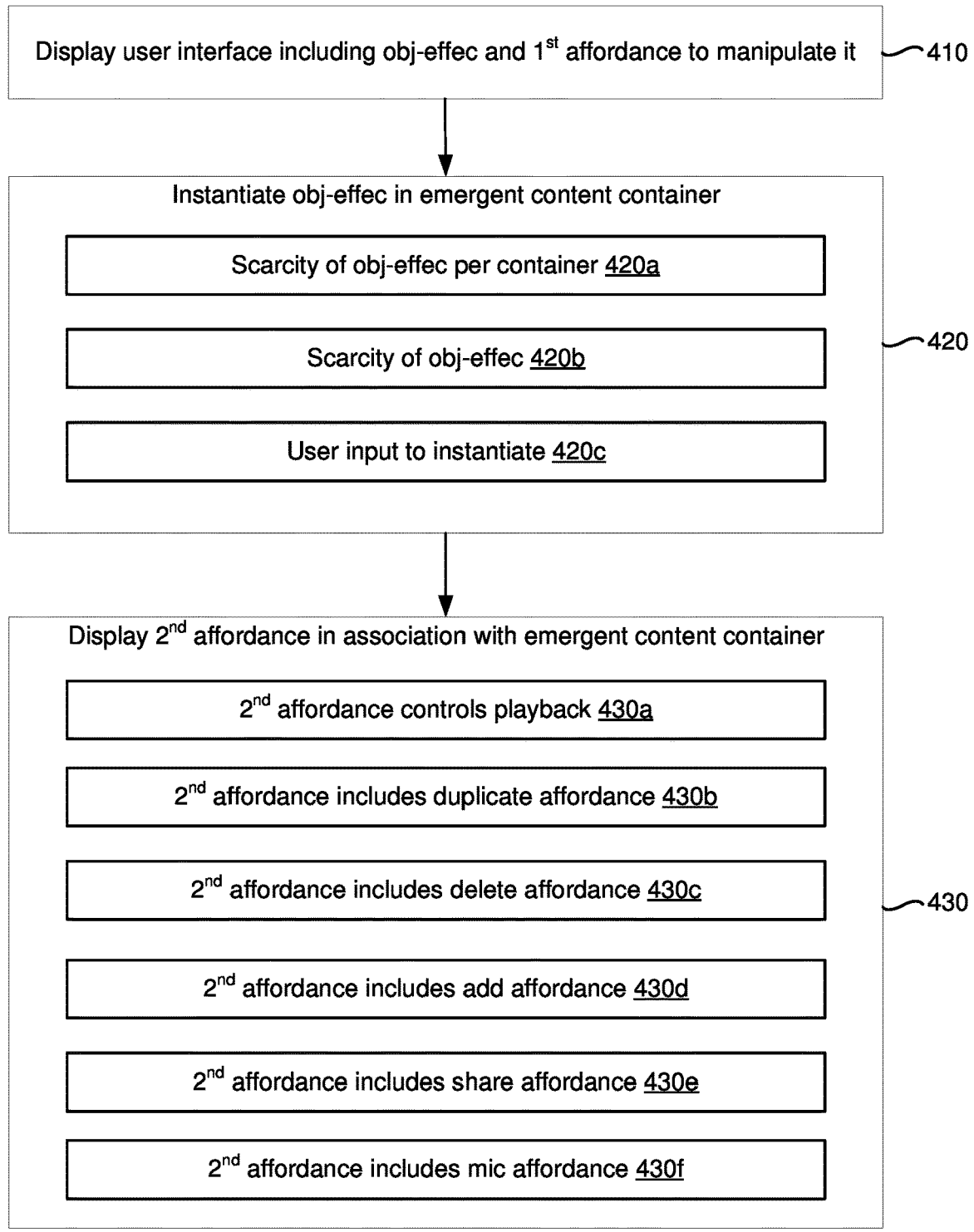
FIGS. 4A-4B are flowchart representations of a method of instantiating objective-effectuators in emergent content containers in accordance with some implementations.

FIG. 4A is a flowchart representation of a method 400 of instantiating objective-effectuators in emergent content containers. In various implementations, the method 400 is performed by a device with a non-transitory memory and one or more processors coupled with the non-transitory memory (e.g., the device 10 shown in FIGS. 1A-1O). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in some implementations, the method 400 includes displaying a user interface including an objective-effectuator and a first affordance to manipulate the objective-effectuator, instantiating the objective-effectuator in an emergent content container, and displaying a second affordance in association with the emergent content container.

As represented by block 410, in various implementations, the method 400 includes displaying a user interface (e.g., the user interface 20 shown in FIGS. 1A-1O) that includes an objective-effectuator (e.g., the girl objective-effectuator 42b displayed within the objective-effectuator pane 30 shown in FIG. 1A) and a first affordance to manipulate the objective effectuator (e.g., the girl manipulation affordance 44b displayed within the girl objective-effectuator container 40b shown in FIG. 1A). In some implementations, the objective-effectuator is characterized by a set of predefined objectives and a set of visual rendering attributes.

As represented by block 420, in various implementations, the method 400 includes instantiating the objective-effectuator in an emergent content container (e.g., instantiating the girl objective-effectuator 42b in the emergent content container 70, for example, as shown in FIG. 1C). In some implementations, the emergent content container allows the objective-effectuator to perform actions that satisfy the set of predefined objectives. Instantiating the objective-effectuator in the emergent content container improves the operability of the device by displaying dynamic objective-effectuators instead of static objects.

As represented by block 420a, in some implementations, the method 400 includes determining a number of instances of the objective-effectuator that are instantiated in the emergent content container (e.g., as indicated by the girl usage indicator 80b and the drone usage indicator 80d shown in FIG. 1K), and instantiating the objective-effectuator in the emergent content container in response to the number of instances satisfying a threshold. In some implementations, the method 400 includes instantiating the objective-effectuator in response to the number of instances being less than the threshold. In some implementations, different objective-effectuators are associated with different thresholds (e.g., as illustrated by the girl usage indicator 80b and the drone usage indicator 80d shown in FIG. 1K). Controlling the number of instances of an objective-effectuator that can be instantiated improves the operability of the device and enhances the user experience by providing a user interface that is less cluttered. Limiting the number of instances of an objective-effectuator that can be instantiated also provides more control to an entity that created/owns the objective-effectuator.

As represented by block 420b, in some implementations, the method 400 includes determining a number of instances of the objective-effectuator that are instantiated in the emergent content container and other emergent content containers, and instantiating the objective-effectuator in the emergent content container in response to the number of instances satisfying a threshold (e.g., in FIGS. 1E-1F, the girl objective-effectuator 42b is instantiated in the emergent content container 70 because the girl availability indicator 46b indicates that five instances of the girl objective-effectuator 42b are available). In some implementations, the method 400 includes instantiating the objective-effectuator in response to the number of instances being less than the threshold. In some implementations, different objective-effectuators are associated with different thresholds (e.g., as illustrated by the boy availability indicator 46a and the robot availability indicator 46c shown in FIG. 1D). In some implementations, the threshold is a function of a size of the emergent content container and/or the device displaying the emergent content container. Limiting the number of instances of an objective-effectuator that can be instantiated prevents overcrowding of the user interface thereby improving the visibility of the user interface. Preventing overcrowding of the user interface tends to enhance the battery life of the device (e.g., by improving the likelihood that the user will be able to select a desired item instead of inadvertently selecting the wrong item).

As represented by block 420c, in some implementations, the method 400 includes receiving a user input at a location corresponding to the objective-effectuator (e.g., the user input 90a shown in FIG. 1B), and instantiating the objective-effectuator in the emergent content container in response to receiving the user input (e.g., as illustrated in FIGS. 1B-1C, the girl objective-effectuator 42b is instantiated in the emergent content container 70 in response to receiving the user input 90a).

As represented by block 430, in various implementations, the method 400 includes displaying a second affordance in association with the emergent content container (e.g., displaying the container affordances 72 shown in FIG. 1C). In some implementations, the second affordance controls an operation of the emergent content container (e.g., as illustrated in FIGS. 1I-1J). Being able to control the operation of the emergent content container improves the operability of the device by increasing the number of functions that the device can perform.

As represented by block 430a, in some implementations, the second affordance controls playback of the actions that the objective-effectuator performs within the emergent content container in order to satisfy the set of predefined objectives. For example, in some implementations, the second affordance includes one or more of a play affordance to start playback of the actions (e.g., the play affordance 72f shown in FIG. 1C), a pause affordance to pause playback of the actions (e.g., the pause affordance shown in FIG. 1J), a fast forward affordance (e.g., the fast forward affordance 72g shown in FIG. 1C), a rewind affordance (e.g., the rewind affordance 72e), and a record affordance to record the actions (e.g., the record affordance 72h).

As represented by block 430b, in some implementations, the second affordance includes a duplicate affordance (e.g., the duplicate objective-effectuator affordance 72j shown in FIG. 1C). In some implementations, the method includes receiving a user input selecting the duplicate affordance, and instantiating another instance of the objective-effectuator within the emergent content container in response to the user input selecting the duplicate affordance. Providing a duplicate affordance enhances the user experience and improves the operability of the device. For example, a user is able to duplicate an objective-effectuator by tapping the duplicate affordance instead of dragging the objective-effectuator from the objective-effectuator pane to the emergent content container thereby reducing the amount of time required to duplicate an objective-effectuator.

As represented by block 430c, in some implementations, the second affordance includes a delete affordance (e.g., the delete objective-effectuator affordance 72k shown in FIG. 1C). In some implementations, the method includes receiving a user input selecting the delete affordance, and deleting the objective-effectuator from the emergent content container in response to the user input selecting the delete affordance.

As represented by block 430d, in some implementations, the second affordance includes an add affordance that allows additional objective-effectuators to be instantiated within the emergent content container (e.g., the add objective-effectuator affordance 72i shown in FIG. 1C). In some implementations, the method includes receiving a user input selecting the add affordance, and instantiating another objective-effectuator within the emergent content container in response to the user input selecting the add affordance.

As represented by block 430e, in some implementations, the second affordance includes a share affordance (e.g., the share affordance 72b shown in FIG. 1C). In some implementations, the method includes receiving a user input selecting the share affordance, and sharing the emergent content container with another device in response to the user input selecting the share affordance. Providing the share affordance improves the operability of the device by allowing the user to create a personalized emergent content container and distribute the personalized emergent content container to other devices thereby reducing the need to re-create the personalized emergent content container on other devices.

As represented by block 430f, in some implementations, the second affordance includes a microphone (mic) affordance (e.g., the mic affordance 72c shown in FIG. 1C). In some implementations, the method includes receiving a user input selecting the mic affordance, obtaining an audio input via a microphone of the device, and changing at least one of the actions of the objective-effectuator in response to the audio input. The mic affordance enhances user experience and improves the operability of the device by allowing a user of the device to interact with objective-effectuators in the emergent content container, and to affect (e.g., alter) the plot and/or storyline of an objective-effectuator that is instantiated in the emergent content container.

Figure 4B:
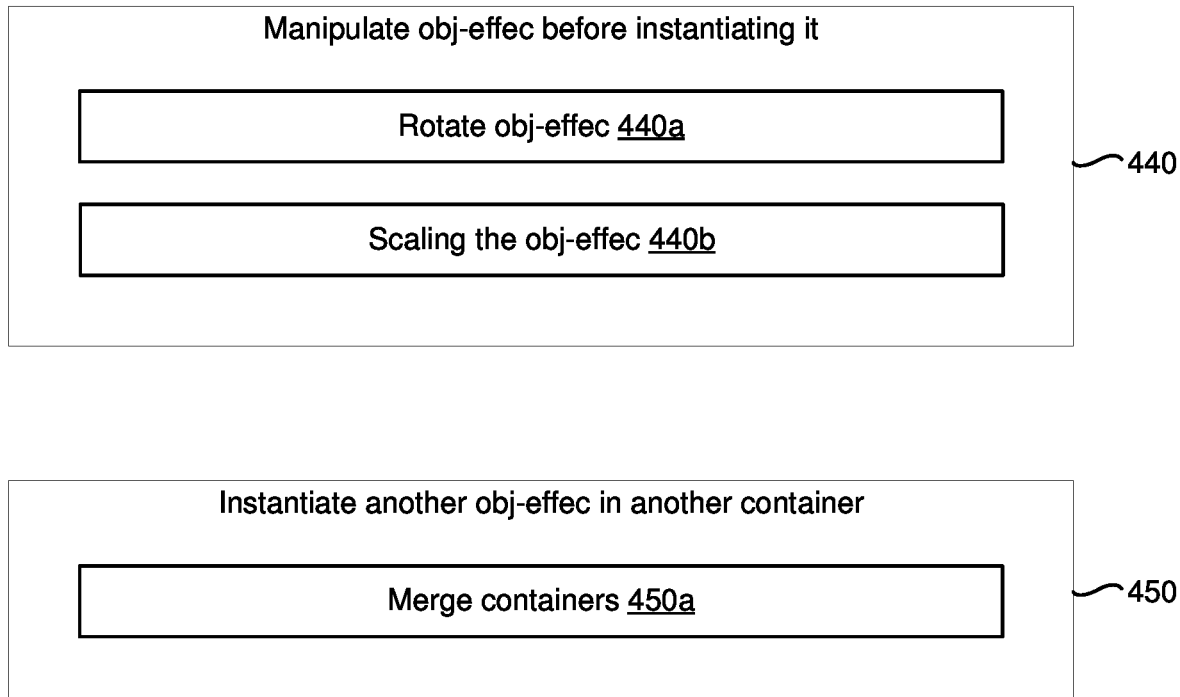

Referring to FIG. 4B, as represented by block 440, in some implementations, the method 400 includes detecting a user input selecting the first affordance (e.g., a user input selecting the robot manipulation affordance 44c shown in FIG. 1A), and manipulating the objective-effectuator in response to detecting the user input (e.g., rotating the robot objective-effectuator 42c). For example, as represented by block 440a, in some implementations, manipulating the objective-effectuator includes rotating the objective-effectuator. As represented by block 440b, in some implementations, manipulating the objective-effectuator includes scaling the objective-effectuator in order to change a size of the objective-effectuator. The manipulation affordance enhances user experience by allowing a user of the device to examine an objective-effectuator before instantiating the objective-effectuator in the emergent content container. The manipulation affordance tends to improve the battery life of the device by allowing the user to inspect the objective-effectuator prior to instantiating the objective-effectuator thereby preventing unnecessary user inputs corresponding to removal of some objective-effectuators from the emergent content container.

As represented by block 450, in some implementations, the method 400 includes instantiating another objective-effectuator in another emergent content container (e.g., instantiating an instance of the drone objective-effectuator 42d in the second emergent content container 70a shown in FIG. 1M). Presenting multiple emergent content containers concurrently enhances the user experience by allowing the user to view two content streams concurrently. Displaying multiple emergent content containers also improves battery life by allowing concurrent viewing of two content streams instead of sequential viewing of the two content streams.

As represented by block 450a, in some implementations, the method 400 includes receiving a user input to merge the emergent content container with the other emergent content container (e.g., receiving the user input 90f shown in FIG. 1N), and merging the emergent content container with the other emergent content container in response to receiving the user input to merge (e.g., to form the merged emergent content container 70c shown in FIG. 1O). In some implementations, the merged emergent content container includes the objective-effectuator and the other objective-effectuator (e.g., the merged emergent content container 70c in FIG. 1O includes the objective-effectuators instantiated in the emergent content containers 70 and 70a shown in FIGS. 1M-1N). Merging multiple emergent content containers to form a merged emergent content container enhances user experience by allowing the user to discover new plots and storylines that originate due to the merge operation. Merging also improves battery life and enhances the operability of the device, for example, by allowing the user to merge two existing emergent content containers instead of requiring unnecessary user inputs to create an equivalent emergent content container from scratch.

Figure 5:
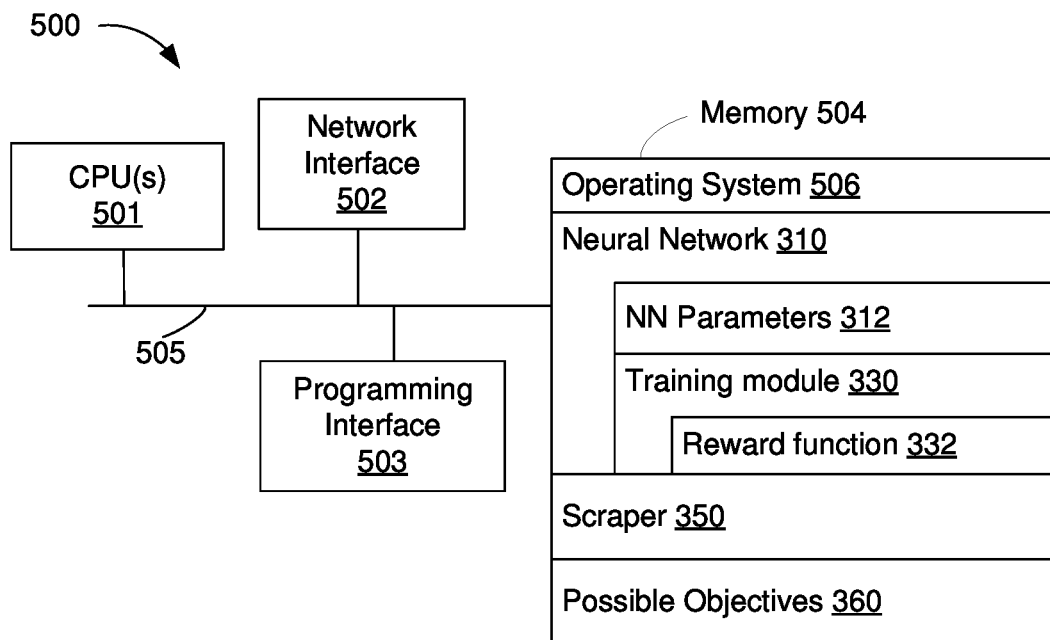
FIG. 5 is a block diagram of a server system enabled with various components of the emergent content engine in accordance with some implementations.

FIG. 5 is a block diagram of a server system 500 enabled with one or more components of a device (e.g., the device 10 shown in FIG. 1A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the CPU(s) 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the neural network 310, the training module 330, the scraper 350, and the possible objectives 360. As described herein, the neural network 310 is associated with the neural network parameters 312. As described herein, the training module 330 includes a reward function 332 that trains (e.g., configures) the neural network 310 (e.g., by determining the neural network parameters 312). As described herein, the neural network 310 determines objectives (e.g., the objectives 254 shown in FIGS. 2-3B) for objective-effectuators in an emergent content container and/ or for the environment of the emergent content container.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, a non-transitory memory and one or more processors coupled with the display and the non-transitory memory:
        displaying, via the display, a user interface that includes a plurality of available objective-effectuators;
        detecting a first user input that corresponds to instantiating a first objective-effectuator from among the available objective-effectuators into an emergent content container;
        detecting a second user input that corresponds to instantiating a second objective-effectuator from among the available objective-effectuators into the emergent content container;
        in response to detecting the first and second inputs, concurrently displaying, via the display, the first objective-effectuator and the second objective-effectuator within the emergent content container with a set of control for managing the emergent content container including an execution control;
        detecting a third user input directed to the execution control; and
        in response to detecting the third user input:
            generating one or more objectives for the first objective-effectuator and the second objective-effectuator, wherein a respective objective among the one or more objectives corresponds to an interaction between the first objective-effectuator and the second objective-effectuator;
            generating a first set of actions for the first objective-effectuator that satisfy the one or more objectives;
            generating a second set of actions for the second objective-effectuator that satisfy the one or more objectives and
            concurrently displaying, via the display, the first objective-effectuator performing the first set of actions within the emergent content container and the second objective-effectuator performing the second set of actions within the emergent content container.

2. The method of claim 1, wherein the first objective-effectuator corresponds to a character capable of performing actions, and the second objective-effectuator corresponds to an equipment item.

3. The method of claim 2, wherein the respective objective that corresponds to the interaction between the first objective-effectuator and the second objective-effectuator includes the character using the equipment item within the emergent content container.

4. The method of claim 1 wherein the respective objective that corresponds to the interaction between the first objective-effectuator and the second objective-effectuator includes the first objective-effectuator following the second objective-effectuator.

5. The method of claim 1 wherein the respective objective that corresponds to the interaction between the first objective-effectuator and the second objective-effectuator includes the first objective-effectuator avoiding the second objective-effectuator.

6. The method of claim 1, wherein the one or more objectives are within a degree of similarity to a set of possible objectives associated with the first objective-effectuator and the second objective-effectuator.

7. The method of claim 6, further comprising:
    identifying the set of possible objectives by analyzing pre-existing content.

8. The method of claim 1, wherein the one or more objectives for are generated based at least in part on contextual information characterizing the emergent content container.

9. The method of claim 1, wherein the one or more objectives are generated based at least in part on behavioral characteristics of the first objective-effectuator and the second objective-effectuator.

10. The method of claim 1, wherein the one or more objectives are generated by a neural network.

11. The method of claim 1, further comprising:
updating the one or more objectives after the first objective-effectuator performs the first set of actions within the emergent content container and the second objective-effectuator performs the second set of actions within the emergent content container.

12. A device comprising:
one or more processors;
a non-transitory memory;
a display; and
one or more programs stored in the non-transitory memory, which, when executed by the one or more processors, cause the device to:
 display, via the display, a user interface that includes a plurality of available objective-effectuators;
 detect a first user input that corresponds to instantiating a first objective-effectuator from among the available objective-effectuators into an emergent content container;
 detect a second user input that corresponds to instantiating a second objective-effectuator from among the available objective-effectuators into the emergent content container;
 in response to detecting the first and second inputs, concurrently display, via the display, the first objective-effectuator and the second objective-effectuator within the emergent content container with a set of control for managing the emergent content container including an execution control;
 detect a third user input directed to the execution control; and
 in response to detecting the third user input:
  generate one or more objectives for the first objective-effectuator and the second objective-effectuator, wherein a respective objective among the one or more objectives corresponds to an interaction between the first objective-effectuator and the second objective-effectuator;
  generate a first set of actions for the first objective-effectuator that satisfy the one or more objectives;
  generate a second set of actions for the second objective-effectuator that satisfy the one or more objectives and
  concurrently display, via the display, the first objective-effectuator performing the first set of actions within the emergent content container and the second objective-effectuator performing the second set of actions within the emergent content container.

13. The device of claim 12, wherein the first objective-effectuator corresponds to a character capable of performing actions, and the second objective-effectuator corresponds to an equipment item.

14. The device of claim 13, wherein the respective objective that corresponds to the interaction between the first objective-effectuator and the second objective-effectuator includes the character using the equipment item within the emergent content container.

15. The device of claim 12, wherein the respective objective that corresponds to the interaction between the first objective-effectuator and the second objective-effectuator includes the first objective-effectuator following the second objective-effectuator.

16. The device of claim 12, wherein the respective objective that corresponds to the interaction between the first objective-effectuator and the second objective-effectuator includes the first objective-effectuator avoiding the second objective-effectuator.

17. A non-transitory memory storing one or more programs, which, when executed by one or more processors of a device with a display, cause the device to:
 display, via the display, a user interface that includes a plurality of available obj ective-effectuators;
 detect a first user input that corresponds to instantiating a first objective-effectuator from among the available objective-effectuators into an emergent content container;
 detect a second user input that corresponds to instantiating a second objective-effectuator from among the available objective-effectuators into the emergent content container;
 in response to detecting the first and second inputs, concurrently display, via the display, the first objective-effectuator and the second objective-effectuator within the emergent content container with a set of control for managing the emergent content container including an execution control;
 detect a third user input directed to the execution control; and
 in response to detecting the third user input:
  generate one or more objectives for the first objective-effectuator and the second objective-effectuator, wherein a respective objective among the one or more objectives corresponds to an interaction between the first objective-effectuator and the second objective-effectuator;
  generate a first set of actions for the first objective-effectuator that satisfy the one or more objectives;
  generate a second set of actions for the second objective-effectuator that satisfy the one or more objectives and
  concurrently display, via the display, the first objective-effectuator performing the first set of actions within the emergent content container and the second objective-effectuator performing the second set of actions within the emergent content container.

18. The non-transitory memory of claim 17, wherein the first objective-effectuator corresponds to a character capable of performing actions, and the second objective-effectuator corresponds to an equipment item.

19. The non-transitory memory of claim 18, wherein the respective objective that corresponds to the interaction between the first objective-effectuator and the second objective-effectuator includes the character using the equipment item within the emergent content container.

20. The non-transitory memory of claim 17, wherein the respective objective that corresponds to the interaction between the first objective-effectuator and the second objective-effectuator includes the first objective-effectuator following the second objective-effectuator.

21. The non-transitory memory of claim 17, wherein the respective objective that corresponds to the interaction between the first objective-effectuator and the second objective-effectuator includes the first objective-effectuator avoiding the second objective-effectuator.

* * * * *